United States Patent [19]
Maeda

[11] Patent Number: 5,861,962
[45] Date of Patent: Jan. 19, 1999

[54] SCALING CONTROL DEVICE IN IMAGE PROCESSING APPARATUS

[75] Inventor: Hiroshi Maeda, Kashihara, Japan

[73] Assignee: Sharp Kabushiki Kaisha, Osaka, Japan

[21] Appl. No.: 681,893

[22] Filed: Jul. 29, 1996

[30]    Foreign Application Priority Data

Aug. 22, 1995 [JP]  Japan .................................. 7-213613

[51] Int. Cl.$^6$ ...................................................... H04N 1/40
[52] U.S. Cl. .......................................... 358/451; 382/232
[58] Field of Search .................................... 358/404, 444, 358/443, 451, 428, 426, 452; 395/102, 115; 382/232, 254, 258, 166; 348/580

[56]              References Cited

U.S. PATENT DOCUMENTS

| 3,976,982 | 8/1976 | Eiselen .................................. 340/172.5 |
| 4,282,546 | 8/1981 | Reitmeier .................................. 358/22 |
| 4,568,983 | 2/1986 | Boblick .................................. 358/260 |

FOREIGN PATENT DOCUMENTS

| 0 232 081 A | 8/1987 | European Pat. Off. ........ G06F 15/62 |
| 3-74549 | of 1991 | Japan .............................. H04N 1/393 |
| 7-222151 | of 1995 | Japan .............................. H04N 7/30 |

*Primary Examiner*—David K. Moore
*Assistant Examiner*—Jerome Grant, II
*Attorney, Agent, or Firm*—David G. Conlin; David D. Lowry

[57]             ABSTRACT

In a scaling control device of an image processing apparatus, original image data stored in a storage section are enlarged n times by a scaling section, data are interpolated to the enlarged image data by an interpolating section, and the resulting image data are compressed to 1/n by a compressing section. The processed image data are stored in a storage section within a storage region where the original image data were stored under the control of a storage control section. An expanding section retrieves the processed image data from the storage section and expands the same to an initially specified enlarged-scaling magnification for an output image. As a result, it has become possible to minimize an increase of a capacity of the storage section in response to an increase in image data, and thus, the resulting apparatus becomes less expensive.

25 Claims, 38 Drawing Sheets

(EXAMPLE)
▨ : 0 0 0 1 1 0 1 0 (BINARY REPRESENTATION)

$a_1$ → 0 0 0 1 (BINARY REPRESENTATION)

(x,y) COORDINATE HAVING NO IMAGE DATA IN THE ORIGINAL IMAGE

ERROR: ε

TARGET PIXEL SUBJECT TO PROCESSING: B

W, X, Y, Z ··· QUANTIZED VALUE
th1, th2, th3 ··· THRESHOLD VALUE (BIT POSITION)   (INPUT)      (OUTPUT)

7 6 5 4 3 2 1 0  0 0 0 0 0 0 0 0   0 0 0 0 0 0 1 1

0 0 0 0 0 0 0 1   0 0 0 0 0 0 1 0

0 0 0 0 0 0 1 0   0 0 0 0 0 0 0 1

0 0 0 0 0 0 1 1   0 0 0 0 0 0 0 0

0 0 0 0 0 1 0 0   0 0 0 0 0 1 1 1

⋮                       ⋮

PROCESSING DIRECTION
(MAIN SCANNING) →

| E | F | A | B | C | D |
|---|---|---|---|---|---|

FIG. 32(a)

| PATTERN | E | F | A | B | C | D |
|---|---|---|---|---|---|---|
| 1 | 0 | 0 | >85 | | | |
| 2 | | 0 | >170 | | | |
| 3 | | 0 | 255 | | | |
| 4 | | | 0 | >170 | | |
| 5 | | | 0 | 255 | | |
| 6 | | | | >85 | 0 | |
| 7 | | | | >170 | 0 | |
| 8 | | | | 255 | 0 | 0 |
| 9 | | 0 | 0 | >85 | 0 | |

VALUE RANGE:
0 (WHITE)~255 (BLACK)
BLANK INDICATES
ANY VALUE WITHIN
THE RANGE

| 0 | 0 | 0 | 0 | 255 | 255 | 0 |
|---|---|---|---|-----|-----|---|
| 0 | 0 | 0 | 0 | 255 | 255 | 0 |
| 0 | 0 | 0 | 255 | 255 | 255 | 0 |
| 0 | 0 | 0 | 255 | 255 | 255 | 0 |
| 0 | 0 | 255 | 255 | 255 | 255 | 0 |
| 0 | 0 | 255 | 255 | 255 | 255 | 0 |

SMOOTHING PROCESSING →

| 0 | 0 | 0 | 56 | 113 | 113 | 56 | 0 |
|---|---|---|----|-----|-----|----|---|
| 0 | 0 | 28 | 113 | 198 | 170 | 85 | 0 |
| 0 | 0 | 56 | 141 | 226 | 170 | 85 | 0 |
| 0 | 28 | 113 | 198 | 255 | 170 | 85 | 0 |
| 0 | 56 | 141 | 226 | 255 | 170 | 85 | 0 |

FIG. 38(b)

| ① | ② | ③ |
|---|---|---|
| ④ | ⑤ | ⑥ |
| ⑦ | ⑧ | ⑨ |

⑤ : TARGET PIXEL

FIG. 39

| 0 | 0 | 0 | 130 | 0 | 0 | 0 |
|---|---|---|-----|---|---|---|
| 0 | 0 | 0 | 0 | 130 | 0 | 0 |
| 0 | 0 | 0 | 0 | 0 | 130 | 0 |
| 0 | 0 | 0 | 0 | 0 | 0 | 130 |
| 0 | 0 | 0 | 0 | 0 | 0 | 0 |

SMOOTHING PROCESSING →

| 0 | 0 | 32 | 65 | 32 | 0 | 0 |
|---|---|----|----|----|---|---|
| 0 | 0 | 0 | 32 | 65 | 32 | 0 |
| 0 | 0 | 0 | 0 | 32 | 65 | 32 |
| 0 | 0 | 0 | 0 | 0 | 32 | 65 |
| 0 | 0 | 0 | 0 | 0 | 0 | 32 |

F I G. 48
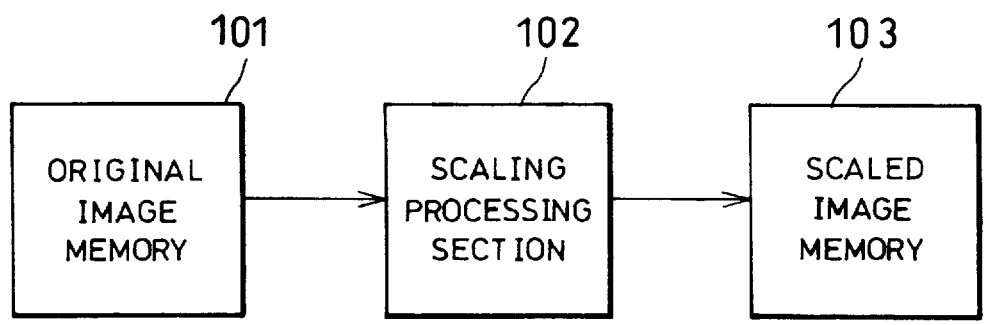
F I G. 49
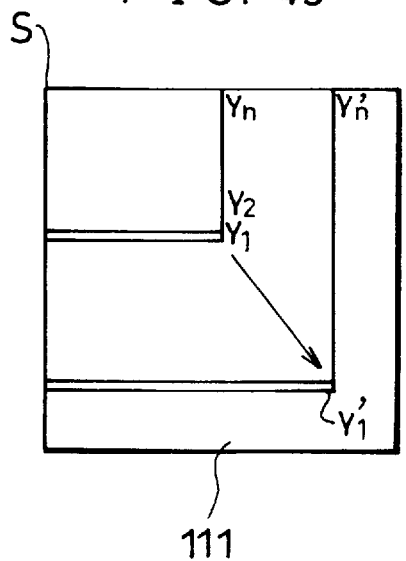

SCALING CONTROL DEVICE IN IMAGE PROCESSING APPARATUS

FIELD OF THE INVENTION

The present invention relates to a scaling control device in an image processing apparatus, such as an image data converting device, a digital copying machine, a facsimile machine, and a digital printer.

BACKGROUND OF THE INVENTION

A digital copying machine known as one of the image processing apparatuses is furnished with a scaling function that allows an output of an enlarged or reduced image of the original. A digital copying machine of this type includes, as shown in FIG. 48, an original image memory 101 for storing image data inputted into the digital copying machine, a scaling processing section 102 for carrying out scaling processing, and a scaled image memory 103 for storing scaled image data. To be more specific, when an enlarged copy is made by this digital copying machine, the image data are retrieved from the original image memory 101, enlarged by the scaling processing section 102, and stored in the scaled image memory 103.

However, according to this arrangement, the digital copying machine must have the original memory 101 and scaled image memory 103 separately, thereby increasing the number of memories and hence the cost of the resulting digital copying machine.

To eliminate this problem, Japanese Examined Patent Publication No. 3-74549 (1991) proposes an arrangement, wherein a single memory is provided for storing both the original image data and the scaled image data obtained as a result of the enlarged-scaling processing. According to this arrangement, the image data are enlarged in the manner illustrated in FIG. 49. That is to say, when the image data stored in lines $Y_1$-$Y_n$ on the image memory 111 are enlarged, the enlarged-scaling processing starts with the line $Y_1$, the line containing the image data located in the remotest place from the reference point S, so that the scaled image data are steadily produced and written into lines $Y_1'$-$Y_n'$ sequentially in ascending order over the memory region where the original image data were stored.

This arrangement can reduce the number of memories. However, it becomes necessary to match a capacity of the image memory 111 with an increase of the image data volume as a result of the enlarged-scaling processing, in other words, the image memory 111 must increase a capacity in proportion to magnification. This undesirably increases the cost of the image memory 111, and hence makes the resulting digital copying machine more expensive.

SUMMARY OF THE INVENTION

It is therefore an object of the present invention to provide a scaling control device of an image processing apparatus capable of minimizing an increase in capacity of a storage section in response to an increase in image data volume as a result of enlarged-scaling processing to save the costs of the resulting apparatus.

To fulfill the above object, a scaling control device of an image processing apparatus of the present invention is characterized by being furnished with:

a storage unit for storing image data;

a scaling unit for enlarging original image data stored in the storage unit;

an interpolating unit for interpolating data into image data processed by the scaling unit;

a compressing unit for compressing the image data processed by the interpolating unit in such a manner that compressed image data will be stored in the storage unit within a storage region, the storage region being smaller than a storage region demanded to store the original image data when the original image data are enlarged to an initially specified magnification for an output image;

a storage control unit for storing the image data processed by the compressing unit in the storage unit within a storage region including a storage region where the original image data were stored; and an expanding unit for retrieving processed image data from the storage unit and for expanding retrieved image data to the initially specified magnification for an output image.

According to the above arrangement, the original image data stored in the storage section are enlarged by the scaling section and data are interpolated to the enlarged image data by the interpolating section. Then, after the interpolation processing, the resulting image data are compressed by the compressing section. Here, the compressing section compresses the image data in such a manner that the compressed image data will be stored in the storage section within a storage region smaller than the one demanded to store the original image data when the same are enlarged to the initially specified magnification for an output image. The image data compressed by the compressing section are stored in the storage section within a storage region including a storage region where the original image data were stored under the control of the storage control section.

Thus, the storage section only needs a storage region smaller than the one demanded to store the image data when the same are enlarged to an initially specified magnification for an output image. Therefore, the storage unit can be downsized and the costs can be saved. Further, the degradation of the image quality can be prevented by the interpolation by the interpolating section.

In addition, the compressed image data stored in the storage section are retrieved and expanded to an initially specified magnification for an output image. Therefore, the image formed based on the image data thus retrieved is enlarged to the initially specified magnification for an output image with respect to the original image.

For a fuller understanding of the nature and advantages of the invention, reference should be made to the ensuing detailed description taken in conjunction with the accompanying drawings.

BRIEF DESCRIPTION OF THE DRAWINGS

FIG. 32(a) is a view explaining another judging operation using data of six pixels aligned in one line as a region, and FIG. 32(b) is a view explaining judging criteria used to judge whether or not the data in the subject region are a text portion;

FIG. 38(a) is a view explaining smoothing processing by a digital copying machine in accordance with still another embodiment of the present invention, and FIG. 38(b) is a view explaining masking processing to determine the pixel density in the smoothing processing of FIG. 38(a);

FIG. 39 is a view explaining the smoothing processing for image data different from those of FIG. 38(a);

FIG. 48 is a block diagram schematically showing a structure of a scaling control device of a conventional image processing apparatus; and FIG. 49 is a view explaining an operation for storing image data in a memory after the enlarged-scaling processing by the scaling control device of the conventional image processing apparatus.

DESCRIPTION OF THE EMBODIMENTS (First Embodiment)

Referring to FIGS. 1 through 20, the following description will describe an example embodiment of the present invention.

Figure 2:
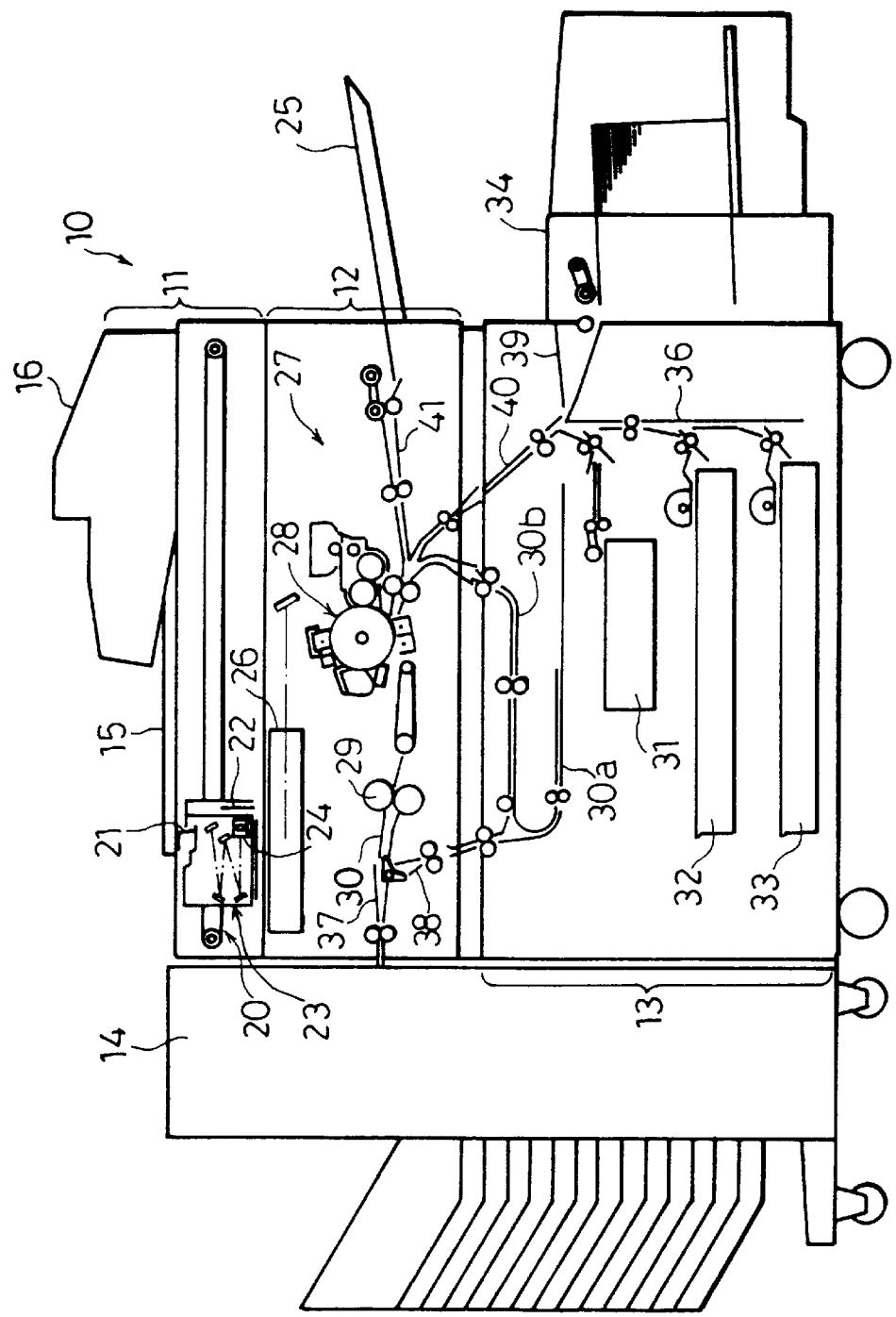
FIG. 2 is a front view of the above digital copying machine depicting the internal structure thereof.

As shown in FIG. 2, an example image processing apparatus, namely, a digital copying machine 10, includes a scanner section 11, a laser printer section 12, a multi-stage paper feeding unit 13, and a sorter 14.

The scanner section 11 includes a document table 15 made of transparent glass, a double-sided automatic document feeding device (RDF) 16, and a scanner unit 20. The multi-stage paper feeding unit 13 includes first through fourth cassettes 31–34, respectively. Each cassette can withhold a pile of papers, and papers are steadily transported from any of the cassettes to the laser printer section 12 one by one from the top of the pile.

The RDF 16 automatically reads a plurality of documents set therein one by one by means of the scanner unit 20. The scanner unit 20 includes a lamp reflector assembly 21 for exposing a document, a CCD (Charge-Coupled Device) 22 made of a photoelectric transforming element, a series of reflecting mirrors 23 for guiding a reflected light image from the document to the CCD 22, and a lens 24 for converging the reflected light from the document to form an image on the CCD 22.

The scanner section 11 is arranged in such a manner that a document set on the document table 15 is scanned, in other words, an image on the document is read as the scanner unit 20 moves along the bottom surface of the document table 15. Also, the scanner section 11 is arranged in such a manner that, when a plurality of documents are read by the RDF 16, the scanner unit 20 is moved to a predetermined position below the RDF 16 and halted, so that an image on each document is read steadily as the documents are transported one by one.

Figure 4:
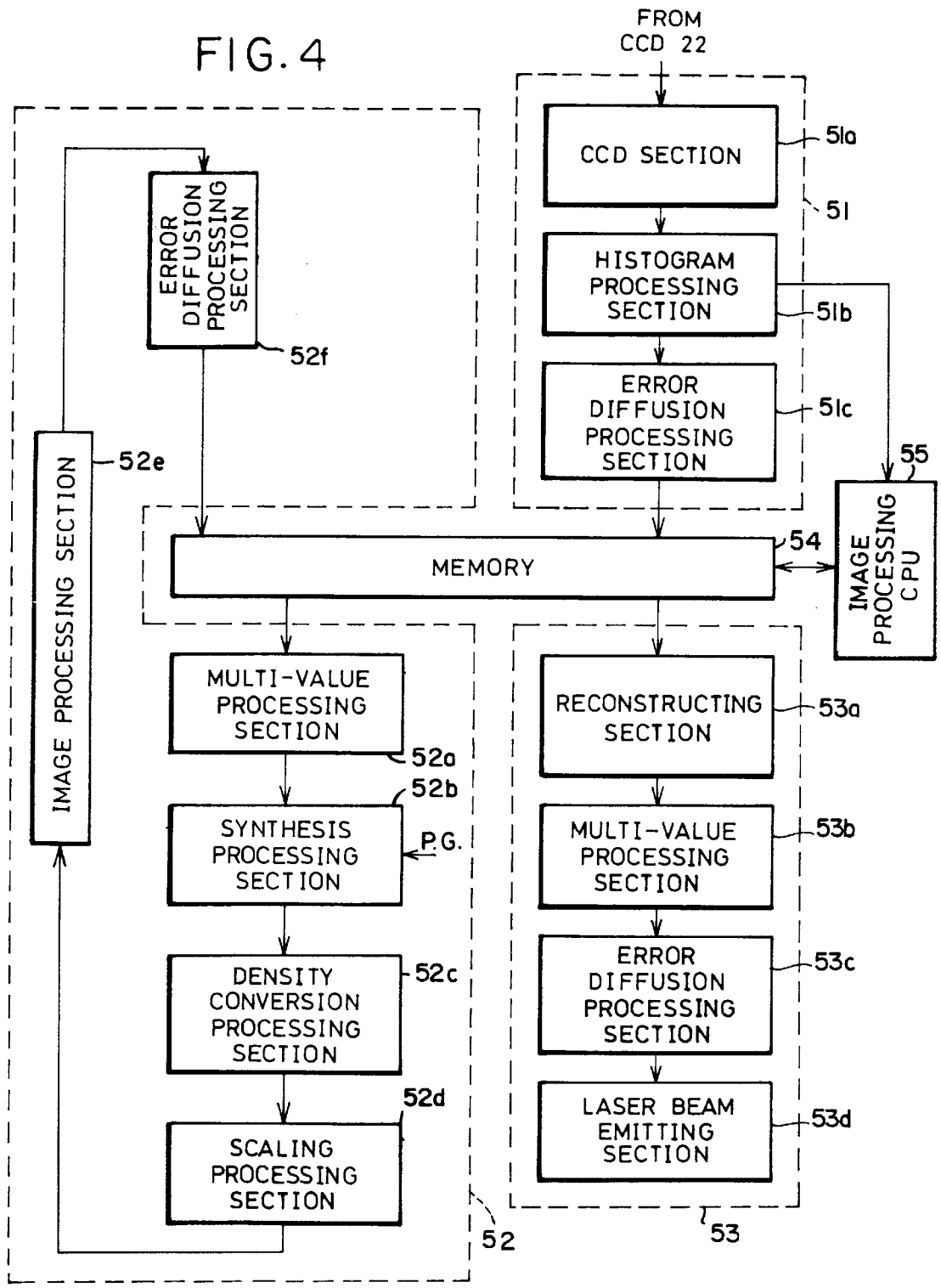
FIG. 4 is a block diagram depicting a structure of an image processing section of FIG. 3.

The image data of the original image obtained through the reading by the scanner unit 20 are sent to an image processing section 50 shown in FIG. 4. After the image data are processed in various manners, the image data are stored temporarily in a memory 54 of the image processing section 50. The image data in the memory 54 are supplied to the laser printer section 12 at an output command to enable the laser printer section 12 to form a copy image on a paper.

The laser printer section 12 includes a manual document tray 25, a laser writing unit 26, and an electrophotographic processing section 27 for forming an image. Although, it is not illustrated in the drawing, the laser writing unit 26 includes a semiconductor laser for emitting a laser beam corresponding to the image data from the memory 54, a polygonal mirror for deflecting the laser beam at isometric speed, and an fθ lens for correcting the laser beam deflected at isometric speed by the polygonal mirror to be deflected at isometric angle on a photosensitive drum 28 of the electrophotographic processing section 27. The electrophotographic processing section 27 includes the photosensitive drum 28, and around which a charging unit, a developing unit, a transferring unit, a separating unit, a cleaning unit, an erasing unit, a fusing unit 29, etc. are provided in a known manner.

Transportation paths 30 and 37, a sorter 14, a transportation path 38, and the multi-stage paper feeding unit 13 are provided in the lower stream of the fusing unit 29 in a direction in which papers are transported. The transportation path 38 branches into a reversing transportation path 30a and a double-sided/synthesizing transportation path 30b in the multi-stage paper feeding unit 13. The former is used when a double-sided copy is made, while the latter is used when a double-sided/synthesized copy is made. Also, a common transportation path 36 is formed in the multi-stage paper feeding unit 13, which merges with a transportation path 39 and communicates to a transportation path 40. The transportation path 40 merges with the double-sided/synthesizing transportation path 30b and a transportation path 41, and communicates to a section between the photosensitive drum 28 and charging unit, where an image is formed.

Thus, the image data retrieved from the memory 54 are outputted from the laser writing unit 26 in the form of a laser beam and forms an electrostatic latent image on the surface of the photosensitive drum 28. The electrostatic latent image thus formed is developed into a visible toner image with toner withheld in the developing unit. The resulting toner image is transferred onto a paper transported from the multi-stage paper feeding unit 13 and fused on the same. Then, the paper is sent to the sorter 14 from the fusing unit 29 through the transportation paths 30 and 37, or to the transportation path 38 in case of double-sided or synthesized copying.

Figure 3:
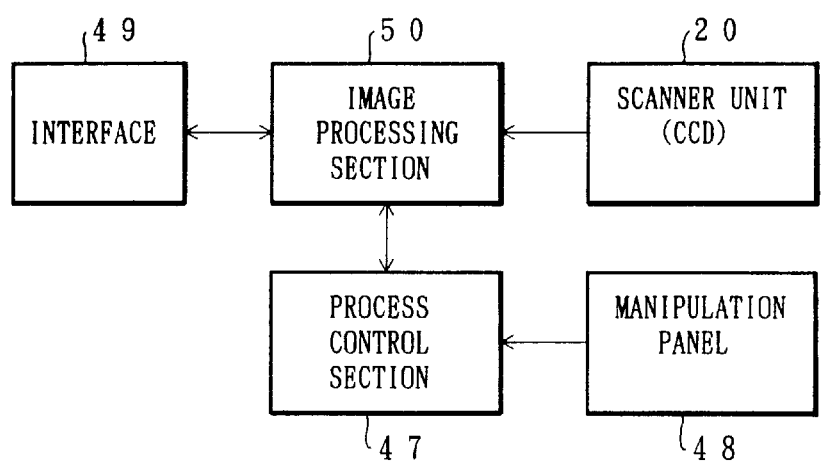
FIG. 3 is a block diagram depicting a major structure of the above digital copying machine.

The digital copying machine 10 of the present embodiment further includes a control system shown in FIG. 3. The control system includes an interface 49, an image processing section 50, a scanner unit 20 identical with the one explained above, a process control section 47, and a manipulation panel 48. As previously mentioned, the scanner unit 20 takes in the image data of a document to input the same to the image processing section 50. The interface 49 is connected to an external device, for example, a personal computer, so that the digital copying machine 10 can form an image based on the image data sent from this personal computer. The process control section 47 controls the entire image forming process of the digital copying machine 10. The manipulation panel 48 is placed on the top surface of the digital copying machine 10 to enable an operator to input operation commands into the process control section 47.

As shown in FIG. 4, the image processing section 50 includes an image data input section 51, an image data processing section 52, an image data output section 53, a memory 54 (storage means), and an image processing CPU (Central Processing Unit) 55 (storage control means and expanding means).

The image data input section 51 includes a CCD section 51a, a histogram processing section 51b, and an error diffusion processing section 51c. The image data input section 51 is arranged to operate in the following manner: the image data input section 51 converts the image data read by the CCD 22 shown in FIG. 2 into binary data first, and thence makes a histogram of digital amount of the binary data to process the image data through the error diffusion method, and stores the resulting data in the memory 54 temporarily.

The CCD section 51a carries out an MTF (Modulation Transfer Function) correction, a black-and-white correction, or a gamma correction after A/D conversion of an analog electric signal corresponding to the density of each pixel forming the image data, and outputs a 256-level (8-bit) digital signal to the histogram processing section 51b.

The histogram processing section 51b adds up the digital signal outputted from the CCD section 51a separately in 256 levels of the pixel density to obtain density information (histogram data). The histogram data thus obtained are sent to the CPU 55 when occasion demands, or sent to the error diffusion processing section 51c as the pixel data.

The error diffusion processing section 51c employs the error diffusion method known as a method in pseudo-half-tone processing. To be more specific, an error caused by conversion into quaternary data is reflected when converting the adjacent pixels into quaternary data. Thus, an 8-bit/pixel digital signal outputted from the CCD section 51a is converted into 2-bit (quaternary data) digital signal and a redistribution computation is carried out to realize a copy image rendering density as true as to the original document in any specific region.

The image data processing section 52 includes a multi-value processing section 52a (judging means), a synthesis processing section 52b, a density conversion processing section 52c, a scaling processing section 52d (scaling means and interpolating means), an image processing section 52e, and an error diffusion processing section 52f (compressing means).

The image data processing section 52 converts the input image data into final image data in a manner desired by the operator. The image data processed by the image data processing section 52 are stored in the memory 54 as the final output image data. Note that each component included in the image data processing section 52 operates only when occasion demands.

The multi-value processing section 52a converts the quaternary data made by the error diffusion processing section 51c into the 256-level data again. Then, the synthesis processing section 52b carries out a logical computation for every pixel, in other words, it selectively computes an OR, an AND, and an exclusive-OR. The data subject to the logical computation are the pixel data stored in the memory 54 and bit data from a pulse generator (PG). The density conversion processing section 52c arbitrary sets a relationship between the input density and output density of the 256-level digital signal with reference to a level converting table prepared in advance. The input density is inputted through the manipulation of a copy density setting key 63 formed on the manipulation panel 48 shown in FIG. 5.

The scaling processing section 52d carries out scaling processing in the sub-scanning direction first, and thence in the main scanning direction. Pixel data (density value) of a subject pixel after the scaling are computed through interpolation processing at a specified magnification based on the input known data.

The image processing section 52e processes the input pixel data in various manners, and collects information on data array to extract the feature and the like. The error diffusion processing section 52f operates in the same manner as the error diffusion processing section 51c in the image data input section 51.

The image data output section 53 includes a reconstructing section 53a, a multi-value processing section 53b, an error diffusion processing section 53c, and a laser beam emitting section 53d. The image data output section 53 is arranged in such a manner that it reconstructs the image data stored in the memory 54 in the form of compressed data to convert the same into the original 256-level digital data, so that it carries out error diffusion of quaternary data which, when formed into an image, renders a smoother half-tone representation than the one formed of the binary data, and transfers the resulting data to the laser beam emitting section 53d.

The reconstructing section 53a reconstructs the image data compressed by the error diffusion processing section 52f. The multi-value processing section 53b operates in the same manner as the multi-value processing section 52a in the image data processing section 52. Likewise, the error diffusion processing section 53c operates in the same manner as the error diffusion processing section 51c in the image data input section 51. The laser beam emitting section 53d converts the digital image data into a laser ON/OFF signal based on a control signal from an unillustrated sequence controller to switch the on/off state of the laser.

Figure 5:
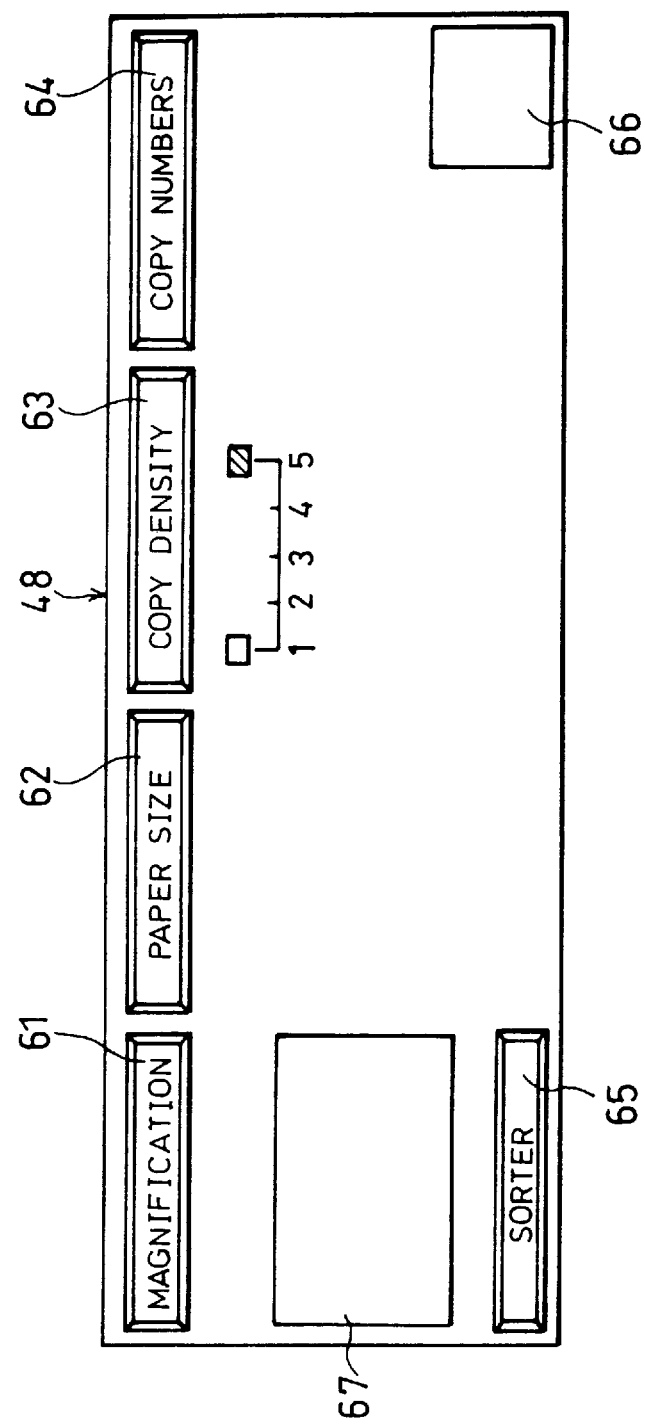
FIG. 5 is a front view of a manipulation panel of the above digital copying machine.

As shown in FIG. 5, the manipulation panel 48 includes a magnification setting key 61, a paper size setting key 62, the copy density setting key 63, a copy numbers setting key 64, a sorter selecting key 65, a copying start key 66, a display section 67, etc. The magnification setting key 61 is used to set a magnification for either enlarged or reduced output image. The paper size setting key 62 is used to set a paper size of a copy image. The copy density setting key 63 is used to set a copy density and the copy numbers setting key 64 is used to set the number of copies. The sorter selecting key 65 is used to specify the use of the sorter 14. The copying start key 66 is used to send a command to start the copying operation. The display unit 67 displays the magnification, paper size, the number of copies, etc. set through the above keys.

The scaling processing during the copying operation by the above-structured digital copying machine 10 will be described with reference to the flowchart of FIG. 1. Assume that the image data is enlarged n (>1) times by the scaling processing and the magnification n is set by the operator.

To begin with, the image data of a document are read by the scanner unit 20 of the scanner section 11, and inputted to the image data input section 51 of the image processing section 50 through the CCD 22. Then, the image data are processed by the CCD section 51a, histogram processing section 51b, and error diffusion processing section 51c, and the processed image data are stored in the memory 54 (S1). Note that the memory 54 is, for example, a page memory capable of storing image data of one side of a largest size of a paper the scanner unit 20 can read.

Subsequently, the image data stored in the memory 54 are inputted into the image data processing unit 52. Then, the image data are processed by the multi-value processing section 52a, synthesis processing section 52b, and density conversion processing section 52c, and the processed image data are enlarged n times by the scaling processing section 52d (S2). Hereinafter, the enlarged image data are referred to as data $M_1$ for the explanation's convenience.

Figure 6:
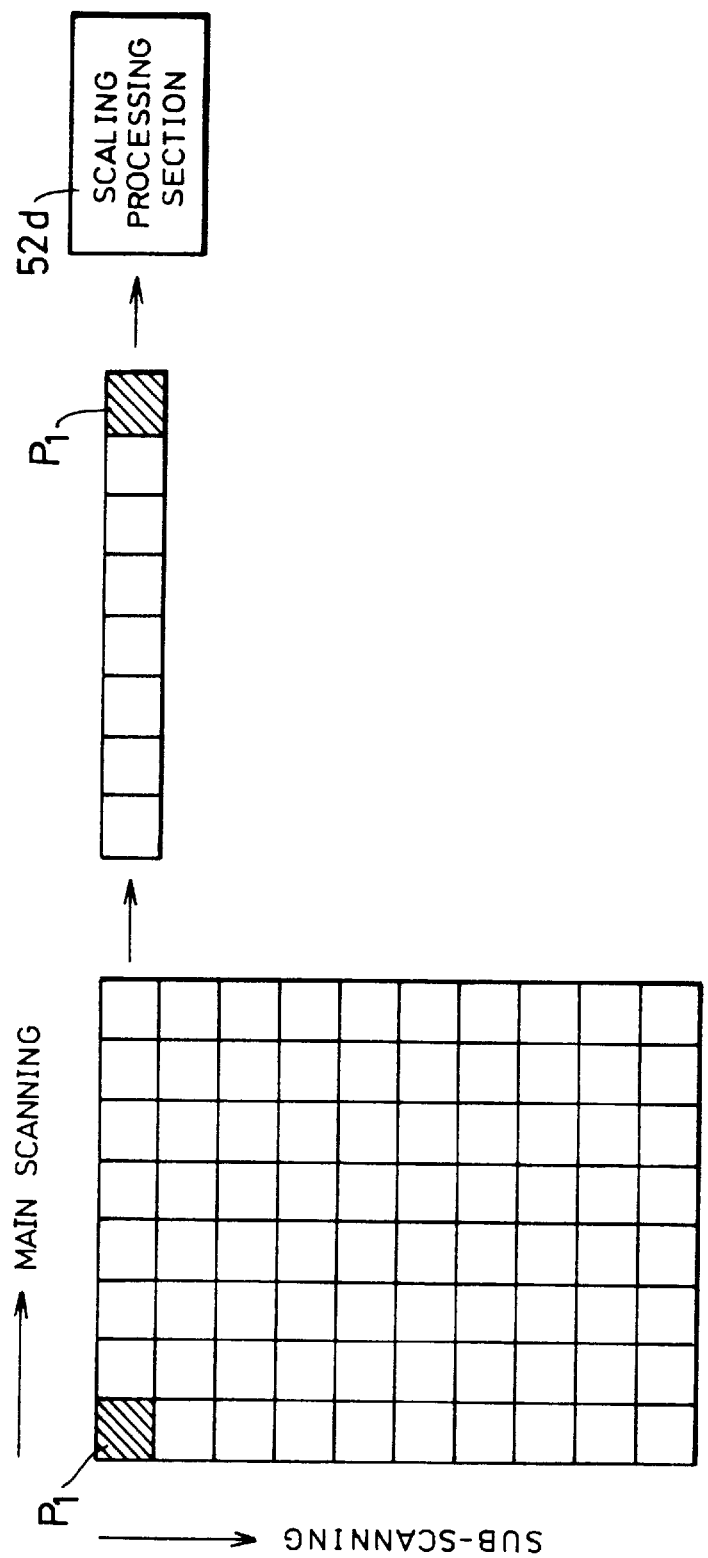
FIG. 6 is a view explaining an operation of retrieving image data from a memory of FIG. 4 during scaling processing.

The image data in the memory 54 are enlarged in S2 in the manner illustrated in FIG. 6. To be more precise, the image data are steadily inputted into the scaling processing section 52d from those of the head pixel $P_1$ indicated by shade. Then, N-bit data forming one pixel are enlarged n times and temporarily stored in a line memory of the scaling processing section 52d.

Interpolation processing is carried out at the same time as the scaling processing (S3). That is to say, the above-explained scaling processing is so-called interpolation scaling. The data $M_1$ are converted into data $M_2$ as a result of the interpolation processing.

The data $M_2$ are inputted into the error diffusion processing section 52f by way of the image processing section 52e, and compressed to 1/n through quantizing value conversion (S4). Hereinafter, the resulting compressed image data are referred to as data $M_3$ for the explanation's convenience. The compression processing is carried out to compress the image data to 1/n or less. In other words, the image data are compressed to 1/n' (n'≧n).

Next, the data $M_3$ are stored in the memory 54 at a storage region where the original pixel data were stored, in other words, the data $M_3$ are written over the original image data (S5). As a result, the original data are erased and only the processed image data, that is, the image data subjected to interpolation scaling first and thence compression, are stored in the memory 54.

S2–S5 are repeated until all of the original image data stored in the memory 54 are processed (S6).

Figure 7:
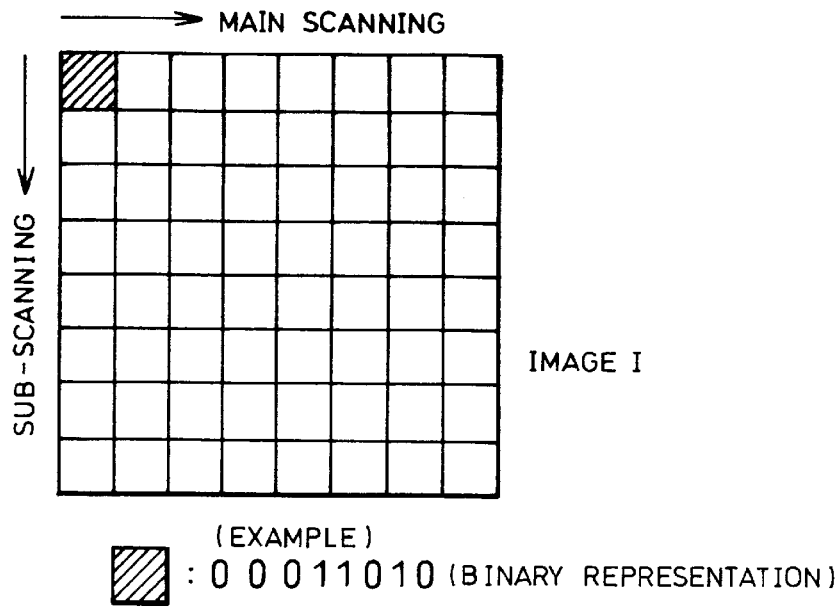
FIG. 7 is a view schematically showing an alignment of pixel data in the memory of FIG. 4.

The above-explained operation will be further detailed in the following. Herein, let the original image data stored in the memory 54 be image data I and each pixel of the original image data I be 8 bits as shown in FIG. 7.

Figure 8:
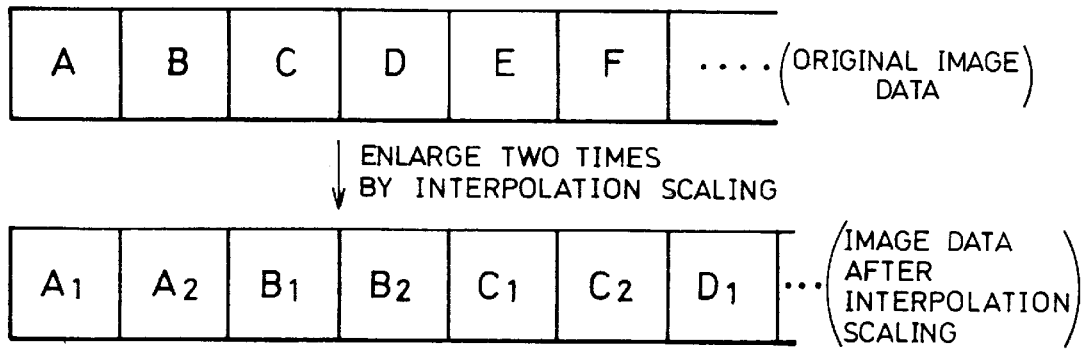
FIG. 8 is a view explaining original pixel data retrieved from the memory in a manner shown in FIG. 7 and image data obtained as a result of 2× interpolation scaling.
Figure 9:
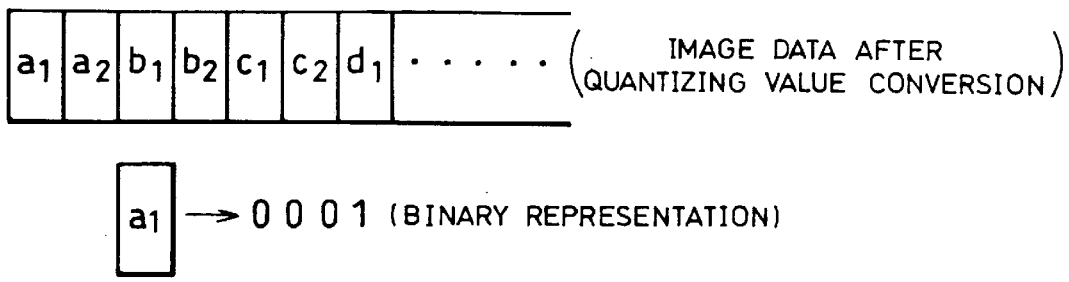
FIG. 9 is a view explaining image data obtained by compressing the image data after the interpolation scaling to ½ through quantizing value conversion.

To begin with, pixel data of the original image data I are steadily retrieved in the main scanning direction to go through the scaling processing. Let the magnification n specified by the operator be 2 and the data retrieved from the memory 54 be A, B, C, D, . . . aligned in alphabetical order from left to right as shown in FIG. 8, then the data enlarged two times through the interpolation scaling will be $A_1$, $A_2$, $B_1$, $B_2$, $C_1$, $C_2$, $D_1$, $D_2$, . . . . Subsequently, these data are compressed to 1/n or less, i.e., ½ or less, as shown in FIG. 9 through quantizing value conversion using the error diffusion processing so as not to degrade the image quality. For example, when the data $A_1$, $A_2$, $B_1$, $B_2$, $C_1$, $C_2$, $D_1$, $D_2$, . . . are compressed to ½, then the data will be $a_1$, $a_2$, $b_1$, $b_2$, $c_1$, $c_2$, $d_1$, $d_2$, . . . . The compressed data are stored in the memory 54 at the storage region where the original image data were stored. Each piece of data $a_1$, $a_2$, $b_1$, $b_2$, . . . are 4 bits, and for example, a data amount of $a_1+a_2$ equals to a data amount (8-bit) of the original image data A shown in FIG. 8. This means that the data $a_1$, $a_2$, $b_1$, $b_2$, . . . are stored in the memory 54 at the storage region where the original image data A, B, . . . were stored without increasing a storage region.

Then, to form an image using the data thus stored in the memory 54, the image processing CPU 55 expands the image data stored in the memory 54 based on the initially set magnification n and outputs the expanded image data. To be more specific, since each piece of the original pixel data are 8 bits, if the original pixel data are compressed to 1/n, the image processing CPU 55 retrieves 8/n-bit data as the data for one pixel from the memory 54. Here, the image processing CPU 55 computes:

(data amount of one original pixel) ×          (A)

(magnification of interpolation scaling) ×

(compression factor) ÷ (initially set magnification).

Then, given n=2, the image processing CPU 55 computes: (8 bits)×2×(½)÷2, and retrieves 4-bit data as the data for one pixel. Hence, an image formed based on the image data thus retrieved is enlarged two times with respect to the original image on the document as was initially specified.

Note that, when the image data are compressed to 1/n', which is smaller than 1/n, the image processing CPU 55 also retrieves data 8/n'-bit data from the memory 54 as the data for one pixel to form an image.

Next, the scaling processing by the scaling processing section 52d will be explained.

Figure 10A:
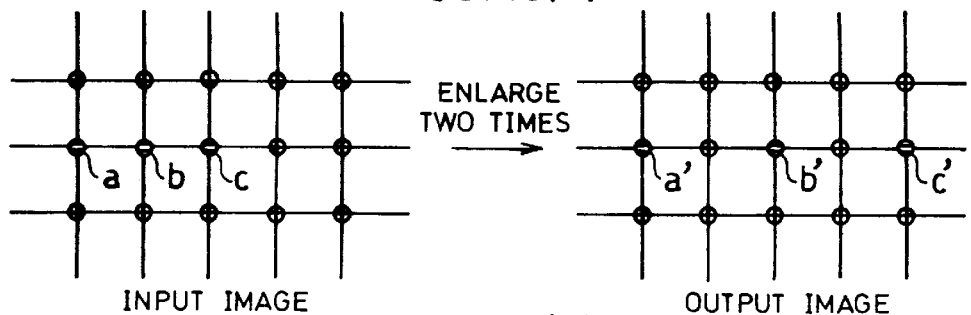
FIG. 10(a) is a view explaining 2× simple scaling processing and FIG. 10(b) is a view explaining ½× simple scaling processing.
Figure 10B:
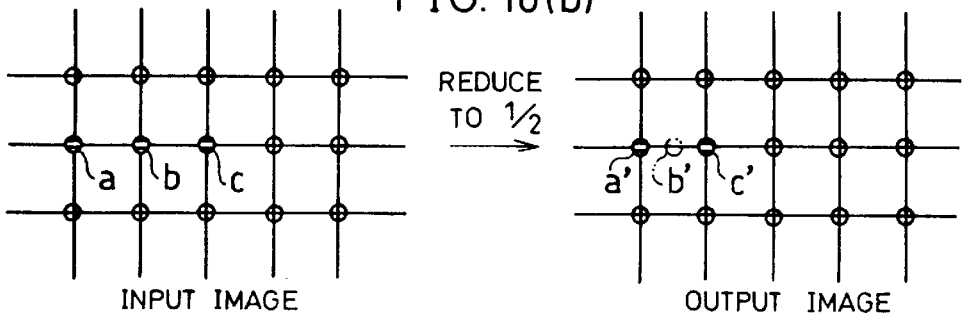

The scaling processing includes simple scaling and interpolation scaling. By the simple scaling, an original image is simply enlarged or reduced. FIGS. 10(a) and 10(b) respectively show an enlarged image and a reduced image as a result of the simple scaling. In the simple scaling, the output image is used as the reference, and therefore, which output image dot maps on to which input image dot is calculated. Herein, the relationship between the input image dot and output image dot is expressed as:

$$x=X/a \quad y=Y/b$$

where a and b are magnifications in the x and y directions, respectively (a, b≧1: enlargement, a, b<1: reduction), x and y are points on the input image, and X and Y are points on the output image.

Figure 11A:
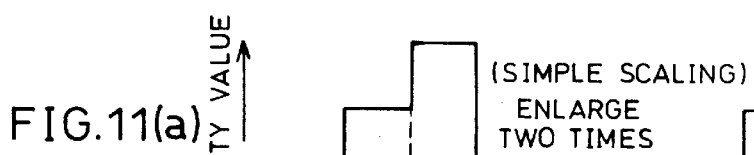
FIG. 11(a) is a view explaining the density of image data obtained by 2× simple scaling processing and FIG. 11(b) is a view explaining the density of image data obtained by 2× interpolation scaling processing.
Figure 11B:
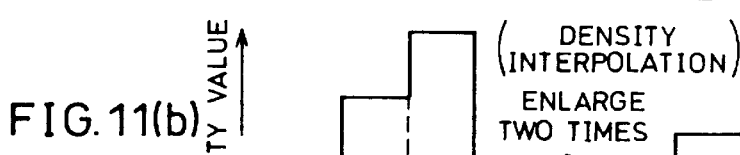

FIG. 11(a) shows the relationship between an enlarged image and a density value in the simple scaling. Here, the density values of the enlarged image change in the same manner as the original image, thereby resulting in poor gradation. To eliminate this problem, the density interpolation, or interpolation scaling, is carried out as shown in FIG. 11(b) in case of enlarged-scaling. As a result, the gradation is compensated and a satisfactory image quality can be attained.

Next, the above interpolation scaling processing will be explained with reference to FIGS. 12 through 15.

Figure 12:
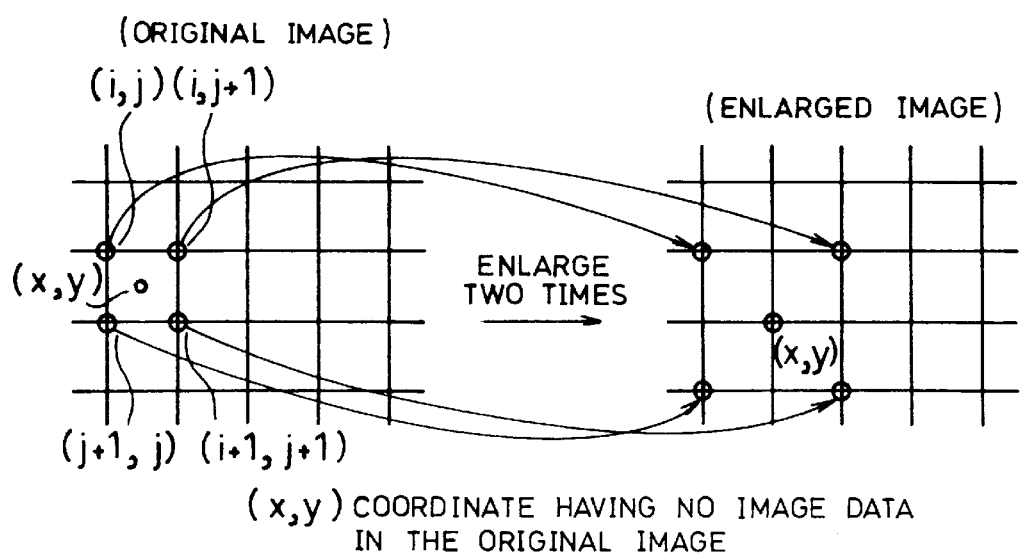
FIG. 12 is a view explaining 2× interpolation processing.

Assume that an original image is enlarged two times, then, the interpolation scaling processing is carried out, as is illustrated in FIG. 12, by supplying density data to a coordinate (x, y) having no image data in the original image. In the drawing, (i, j) represents a coordinate of a pixel; i represents a coordinate in the x direction and j represents a coordinate in the y direction. To be more specific, the image is enlarged by expanding the space between the coordinates (i, j) and (i, j+1), and the space between the coordinates (i, j) and (i+1, j). Then, density data are given to a newly created pixel positioned at the coordinate (x, y).

Figure 13:
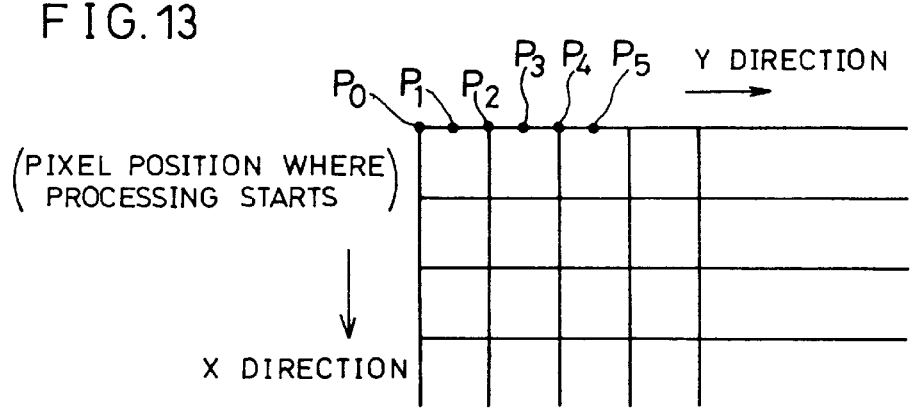
FIG. 13 is a view explaining an operation of computing an interpolation position in the interpolation processing.

The interpolation position is computed in the manner shown in FIG. 13. That is, the coordinates of points $P_1$, $P_2$, $P_3$, . . . of the image are computed using the end point ($P_0$) as the reference point. The coordinates Px(i) and Py(k) of each point are computed as:

$$Px(i)=i\times(1/n) \quad Py(k)=k\times(1/n)$$

where k and i represent a pixel position at scaling and vary as 1, 2, 3, . . . in response to the pixel position, and n represents a magnification and n=2 in the drawing.

Figure 14:
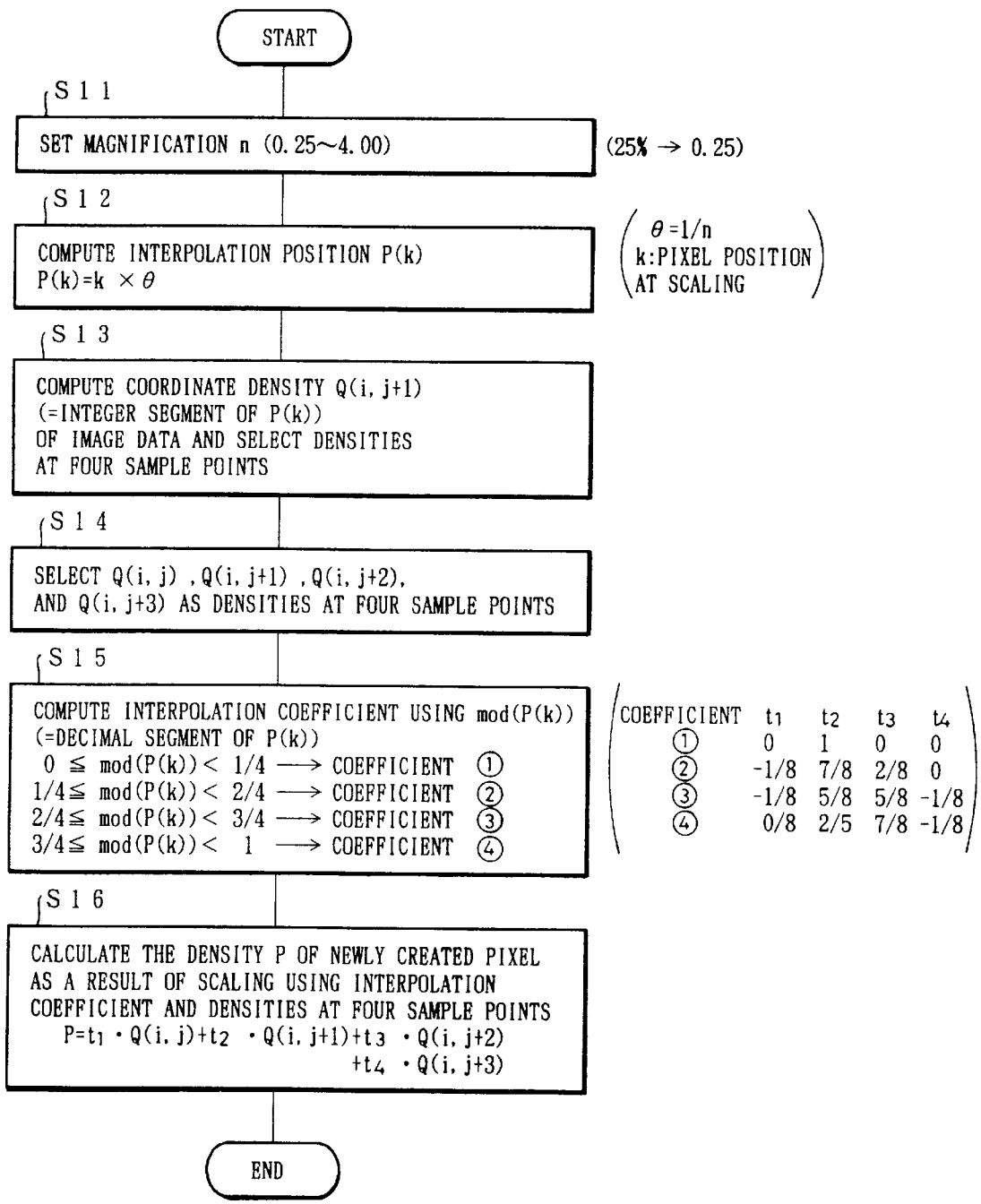
FIG. 14 shows a flowchart detailing a major procedure of the interpolation scaling processing.
Figure 15:
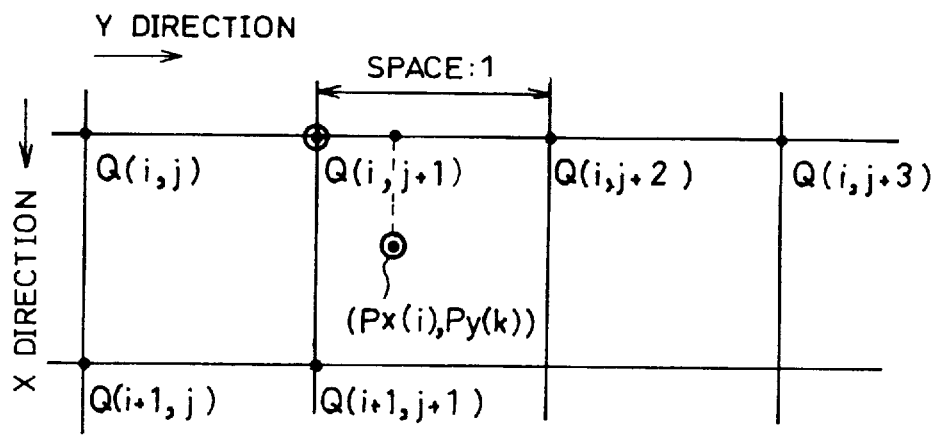
FIG. 15 is a view explaining a process of computing a density at the interpolation position in the interpolation scaling processing.

The procedure of the interpolation scaling is detailed by the flowchart of FIG. 14. Here, assume that the pixels are positioned at (i, j), (i, j+1), (i, j+2), . . . in the Y direction and (i, j), (i+1, j), (i+2, j), . . . in the X direction as shown in FIG. 15, and Q(i, j), Q(i, j+1), represent the density of pixels positioned at their respective coordinates.

As shown in FIG. 14, a magnification n is set in the first place (S11). The magnification n is, for example, in a range between 0.25 and 4.00 inclusive; however, in case of enlarged-scaling, 1≦n≦4.

Assume that the interpolation in the Y direction is carried out first, then an interpolation position P(k) is computed as: P(k)=k×θ, where θ=1/n and k represents a pixel position at scaling (S12).

Next, the density Q(i, j+1) of the image data at the corresponding coordinate, which constitutes an integer segment of P(k) is computed, and densities at four sample points are selected (S13). The densities at four sample points referred herein are Q(i, j+2), Q(i, j+3), and Q(i, j) with Q(i, j+1) serving as the reference (S14).

Next, an interpolation coefficient is computed using mod ((P(k)), which constitutes a decimal segment of P(k) (S15). Here, one of the interpolation coefficients ①–④ is selected in accordance with a value of mod((P(k)).

Then, the density P of a newly created pixel as a result of the scaling is calculated using the interpolation coefficient thus selected and the above densities at four sample points as:

$$P = t_1 \cdot Q(i, j) + t_2 \cdot Q(i, j+1) + t_3 \cdot Q(i, j+2) + t_4 \cdot Q(i, j+3) \quad (S16).$$

Figure 1:
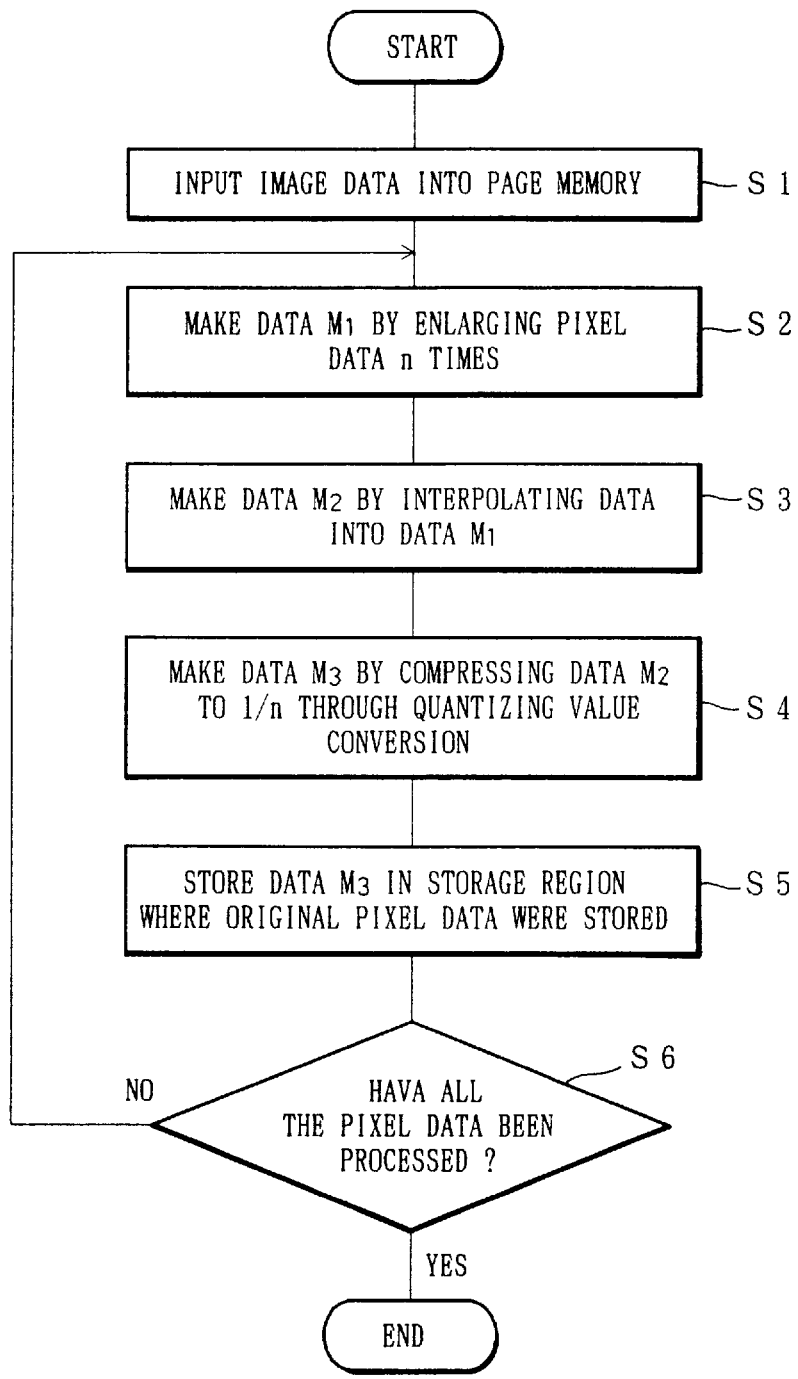
FIG. 1 shows a flowchart detailing an operation sequence of a digital copying machine in accordance with an embodiment of the present invention, and it shows an operation sequence from the image data enlarged-scaling processing to recording into a memory.

Note that P referred herein corresponds to the data $M_2$ in S3 of FIG. 1.

Figure 16:
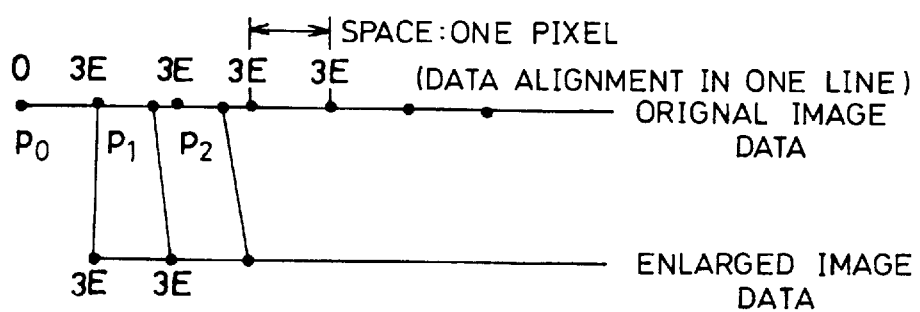
FIG. 16 is a view further explaining the process of computing a density at the interpolation position in the interpolation scaling processing.

The above operation will be described further with reference to FIG. 16.

In the drawing, the upper line represents the data alignment (0, 3E, 3E, 3E, 3E, ...) of the original image data in one line, and the lower line represents the data alignment (3E, 3E, 3E, 3E, ...) of the enlarged image data in the corresponding one line. Note that an interval of one pixel are allowed in the data alignment (0, 3E, 3E, 3E, 3E, ...), and 0 and 3E represent the density data.

In the interpolation scaling, which data in the enlarged image correspond to which data in the original image is computed first. In short, the interpolation position of the data is computed. Herein, the pixel position at the far-left end in the enlarged image corresponds to the position $p_0$ in the original image data where the enlarged-scaling processing starts, and the following pixel positions from left to right correspond to $p_1, p_2, \ldots$, respectively. Since the positions $p_1, p_2, \ldots$ have no original image data, the image data are made and supplied to these positions. This is the operation carried out during interpolation processing.

For example, when the original image data are enlarged to 131%, the positions $p_0, p_1, p_2, \ldots$ are computed as:

$p_0 = 0$ $p_1 = 1 \times 1/1.31 = 0.7633 \ldots$ $p_2 = 2 \times 1/1.31 = 1.5267 \ldots$ This computing process corresponds to S12 of FIG. 14.

Thus, from S15, computing the image density at the position $P_1$ yields:

interpolation position: 0.7633 ..., densities at four sample points: 0(=Q(i,j)), $3E(=Q(i, j+1))$, $3E(=Q(i, j+2))$, and $3E(=Q(i, j+3))$, interpolation coefficient: $0/8(=t_1)$, $2/8(=t_2)$, $7/8(=t_3)$, and $-1/8(=t_4)$, then, the image density P is computed as:

$$P = 0 \times 0 + (2/8) \times 3E + (7/8) \times 3E - (1/8) \times 3E = 3E.$$

Thus, the density data 3E are interpolated to the position $p_1$.

Of the coordinate (Px(i), Py(k)) shown in FIG. 15, the density data of Py(k) were calculated in the above, and the density data of Px(i) are computed in the same manner. Accordingly, the density data thus computed are interpolated as the density data at the coordinate (Px(i), Py(k)). Note that the density data are 8 bits.

Figure 17:
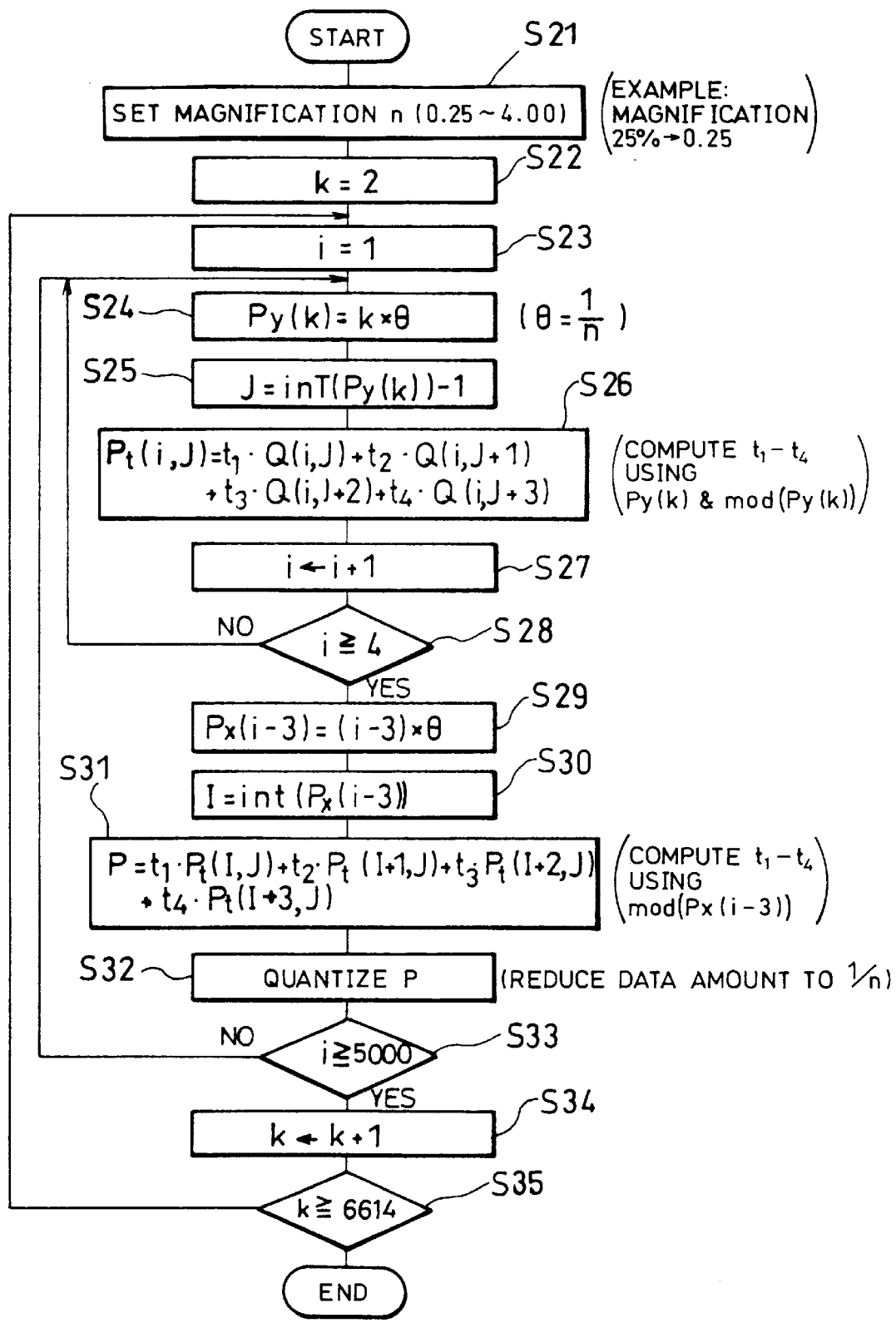
FIG. 17 shows a flowchart detailing an overall operation of the interpolation scaling processing.

The flowchart of FIG. 17 details the interpolation scaling for the image data of one page of a document.

To be more specific, the magnification n is set (S21). Given k=2 (S22) and i=1 (S23), the interpolation position is computed as: Py(k)=k×74 (S24). Note that k=2 is given as an initial value because no interpolation position is necessary for the pixel at the top, or in case of k=1.

Next J, representing a pixel position preceding the target pixel position in the Y direction is computed as: J=int(Py(k))−1 (S25). Subsequently, the density data of the interpolation position are computed as:

$$P_i(i, J) = t_1 \cdot Q(i, J) + t_2 \cdot Q(i, J+1) + t_3 \cdot Q(i, J+2) + t_4 \cdot Q(i, J+3) \quad (S26).$$

Next, i+1 is substituted for i (S27), and S24 through S27 are repeated until i≧4 to proceed to S31 (S28).

Then, when i≧4 in S28, the interpolation position of the data is computed as: Px(i−3)=(i−3)×θ (S29).

Subsequently, a coordinate value is computed by discarding the fractional portion of the coordinate value of the interpolation position as: I=int(Px(i−3)) (S30).

Then, the density data of the interpolation position are computed as:

$$P = t_1 \cdot P_i(I, J) + t_2 \cdot P_i(I+1, J) + t_3 \cdot P_i(I+2, J) + t_4 \cdot P_i(I+3, J) \quad (S31).$$

Subsequently, the density data P computed in S31 are compressed to 1/n through quantizing value conversion (S32). S24 through S32 are repeated until i≧5000 (S33), in other words, until all the data for one line in the X direction are processed. Then, when i≧5000 in S33, k+1 is substituted for k (S34). S23 through S34 are repeated until k≧6614 (S35), in other words, until all the data for one line in the Y direction are processed. The processing ends when k≧6614. Note that the values, such as 5000 in S33 and 6614 in S35, can be changed to arbitrary values depending on the size (length and width) of the document and reading resolution.

Next, the error diffusion processing by the error diffusing processing section 52f will be described. The error diffusion processing explained below is carried out to upgrade the quality of the image data obtained as the result of compression processing by the scaling processing section 52d.

Figure 18:
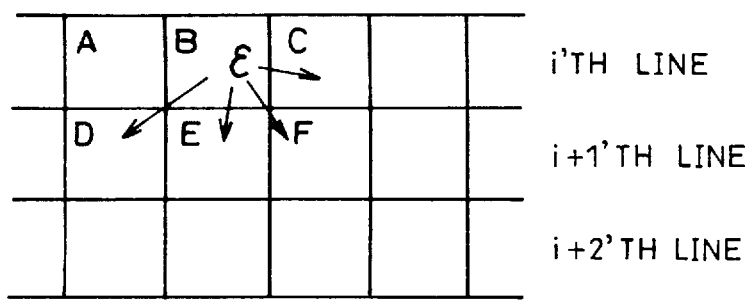
FIG. 18 is a view explaining error diffusion processing by an error diffusion processing section of FIG. 4.
Figure 19:
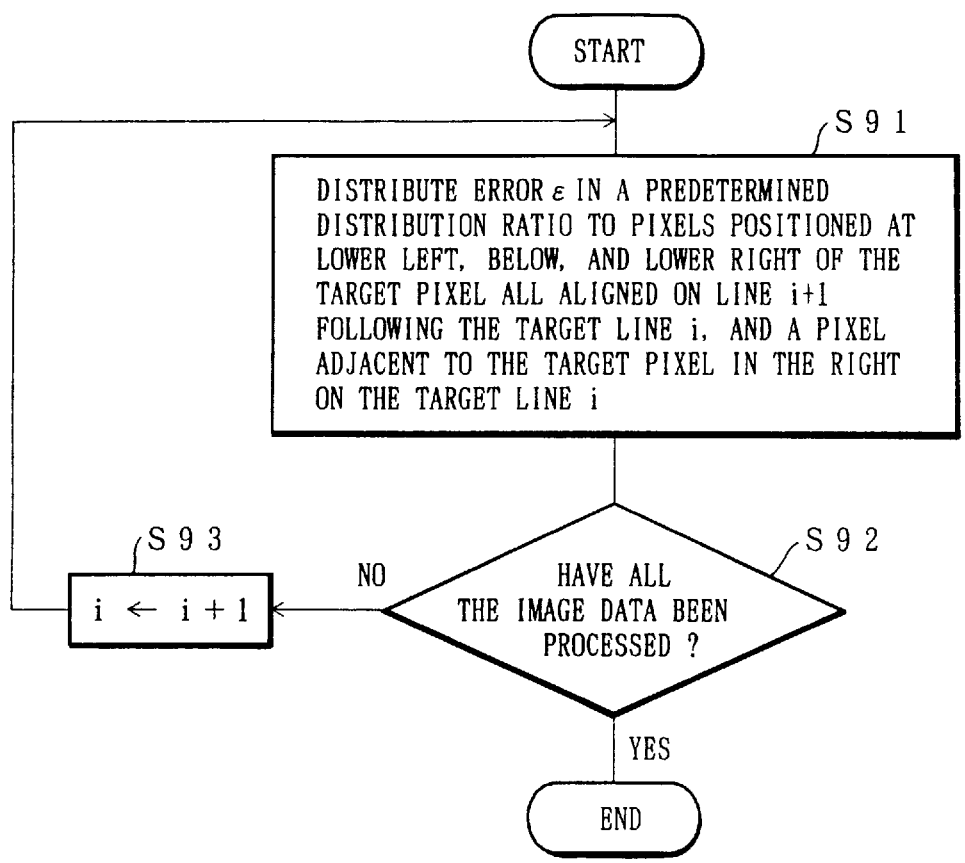
FIG. 19 shows a flowchart detailing a procedure of the error diffusion processing.

Assume that a part of the image data after the interpolation scaling are those shown in FIG. 18 and a pixel B is the target pixel, then the error diffusion processing is carried out as detailed by the flowchart of FIG. 19. That is, an error ε is distributed, in a predetermined distribution ratio, to pixels D, E and F, which are respectively positioned at the lower left, below, and lower right of the target pixel on the line i+1 following the target line i, and a pixel C adjacent to the target pixel in the right on the target line i (S91). S91 is repeated unit all the pixel data are processed (S92 and S93).

Figure 20:
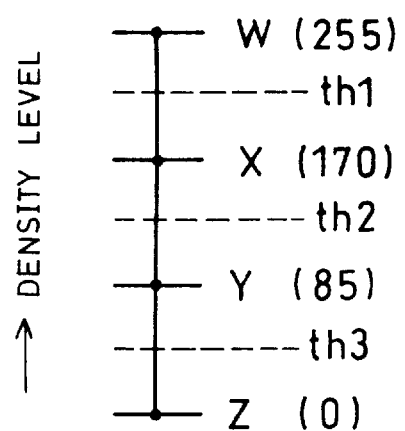
FIG. 20 is a view explaining quantization of the image data by the error diffusion processing section of FIG. 4.

In the compression processing, the image data are quantized using, for example, threshold values $th_1$–$th_3$ as shown in FIG. 20.

As has been explained, when the digital copying machine 10 of the present embodiment makes an enlarged image copy, the image data of the original image are enlarged n times as was specified by the operator through the interpolation scaling first, and then the enlarged image data are compressed to 1/n' (n'≧n) through quantizing value conversion and stored in the memory 54. Then, to make a copy enlarged n times as specified out of the image data thus stored in the memory 54, the image data are retrieved in the following manner: let the image data amount of one pixel in the original image be N, then N/n' of image data are retrieved as the image data of one pixel. Therefore, the image data after the interpolation scaling are written over the original image data in the memory 54 within the storage region where the original image were stored. In other words, the image data after the interpolation scaling are stored in a storage region not larger than the storage region where the original image data were stored. In short, the memory 54 needs a storage region at least large enough to store the original image data. Therefore, it is no longer necessary to increase a capacity of the memory 54, and hence, the costs can be saved.

Further, the interpolation by the scaling processing section 52*d* can prevent degradation of the image quality. In addition, the processed image data stored in the memory 54 are retrieved in the form of expanded data, that is, after being enlarged to the specified magnification by the image processing CPU 55. Thus, an image formed based on the retrieved image data is enlarged to the initially specified magnification with respect to the original image.

The present embodiment describes a case where the image data processed by the error diffusion processing section 52*f* and stored in the memory 54 are compressed to have less volume than the original image data, and therefore, stored within the storage region where the original image data were stored. However, it should be noted that the present invention makes it possible to reduce a storage region in the memory 54 regardless of the enlarged-scaling magnification used at the scaling processing section 52*d*. To be more specific, the storage region in the memory 54 can be reduced when the image data processed by the error diffusion processing section 52*f* are compressed to a level such that can be stored in a storage region smaller than the one demanded to store the original image when the same are enlarged to the specified magnification. The same can be said in all the embodiments below.

(Second Embodiment)

Referring to FIGS. 4, 6, 7, and 21 through 23, the following description will describe another example embodiment of the present invention. Hereinafter, like components are labeled with like reference numerals with respect to the first embodiment, and the description of these components is not repeated for the explanation's convenience.

Figure 21:
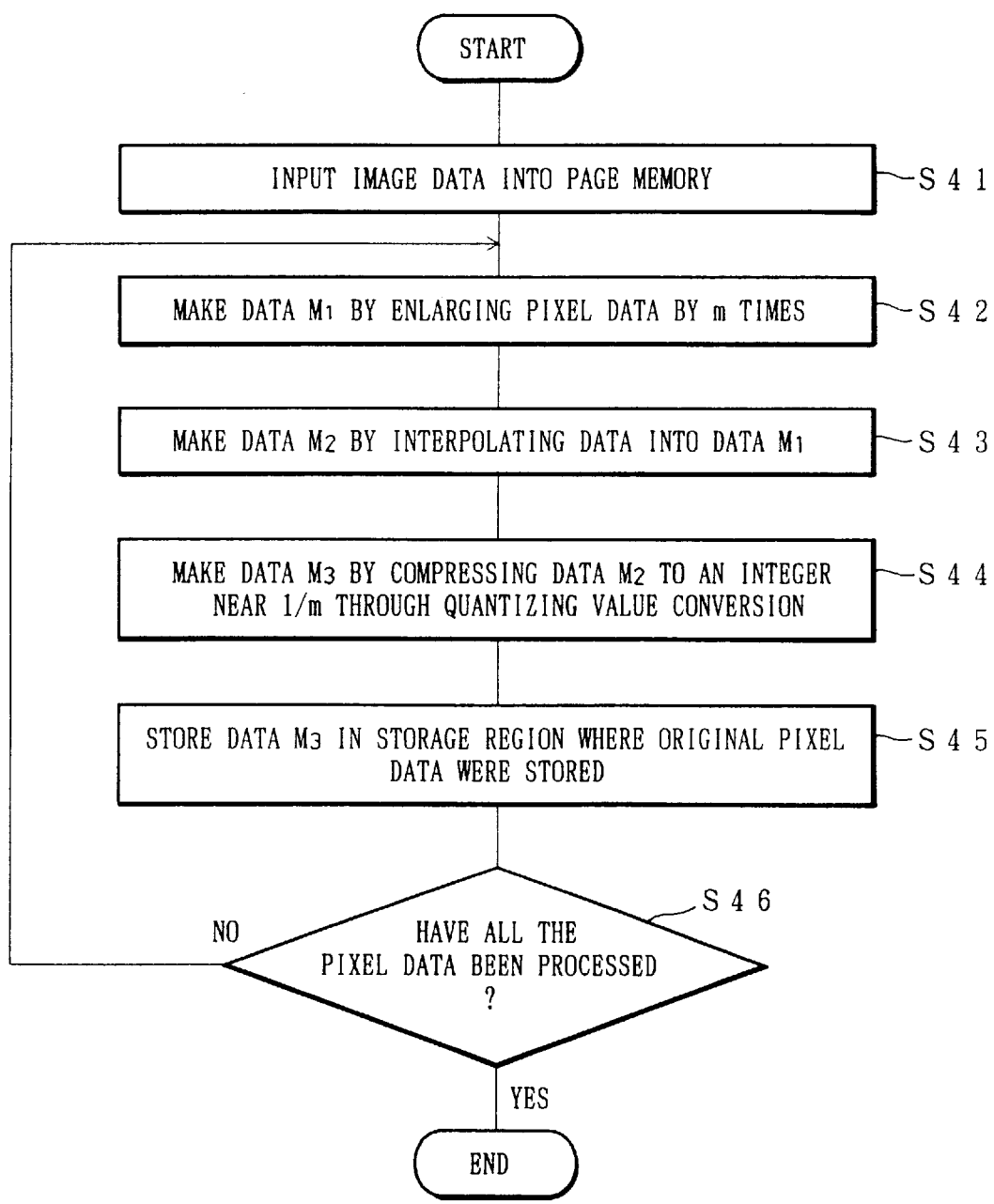
FIG. 21 shows a flowchart detailing an operation sequence of a digital copying machine in accordance with another embodiment of the present invention, and it shows an operation sequence from the image data enlarged-scaling processing to recording into a memory.

The digital copying machine 10 of the present embodiment is of the structure shown in FIG. 4, but it carries out the interpolation scaling detailed in the flowchart of FIG. 21. Assume that the image data are enlarged n (>1) times as the operator specifies in the scaling processing.

To begin with, like in the flowchart of FIG. 1, the image data of a document read by the scanner unit 20 are stored in the memory 54 (S41).

The image data stored in the memory 54 are processed by the multi-value processing section 52*a*, synthesis processing section 52*b*, and density conversion processing section 52*c* of the image data processing section 52 first, and thence enlarged m (m>n) times by the scaling processing section 52*d* (S42). Hereinafter, the enlarged image data are referred to as data $M_1$ for the explanation's convenience.

The image data in the memory 54 are enlarged in S42 in the manner illustrated in FIG. 6. To be more precise, the image data are steadily inputted into the scaling processing section 52*d* from those of the head pixel $P_1$ indicated by shade. Then, N-bit data forming one pixel are enlarged m times and stored temporarily in a line memory of the scaling processing section 52*d*.

Interpolation processing is carried out at the same time as the scaling processing, and the data $M_1$ are converted into data $M_2$ as a result of the interpolation processing (S43).

Then, the data $M_2$ are inputted into the error diffusion processing section 52*f* by way of the image processing section 52*e*, and compressed to an integer value near 1/m through quantizing value conversion (S44). Hereinafter, the compressed data are referred to as data $M_3$ for the explanation's convenience.

Next, the data $M_3$ are stored in the memory 54 at a storage region where the original pixel data were stored, in other words, the data $M_3$ are written over the original image data (45).

S42–S45 are repeated until all the original image data stored in the memory 54 are processed to end the scaling processing (S46).

The above-explained operation will be further detailed in the following.

Figure 22:
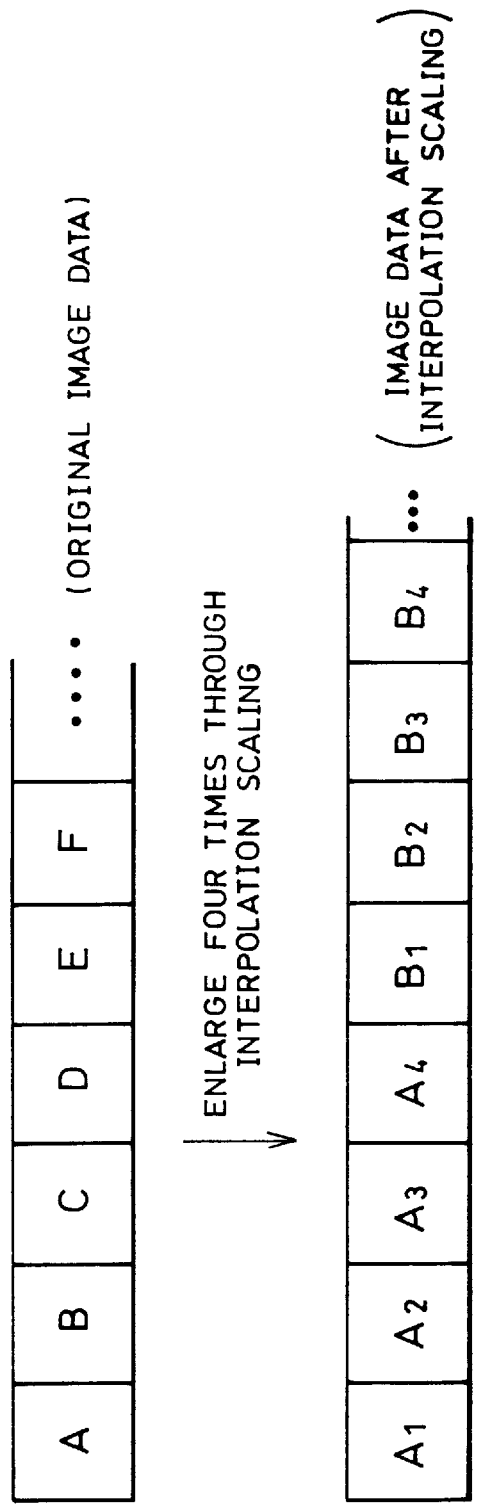
FIG. 22 is a view explaining the original image data retrieved from the memory in a manner shown in FIG. 7 and the image data obtained 4× interpolation scaling in accordance with the processing of FIG. 21.
Figure 23:
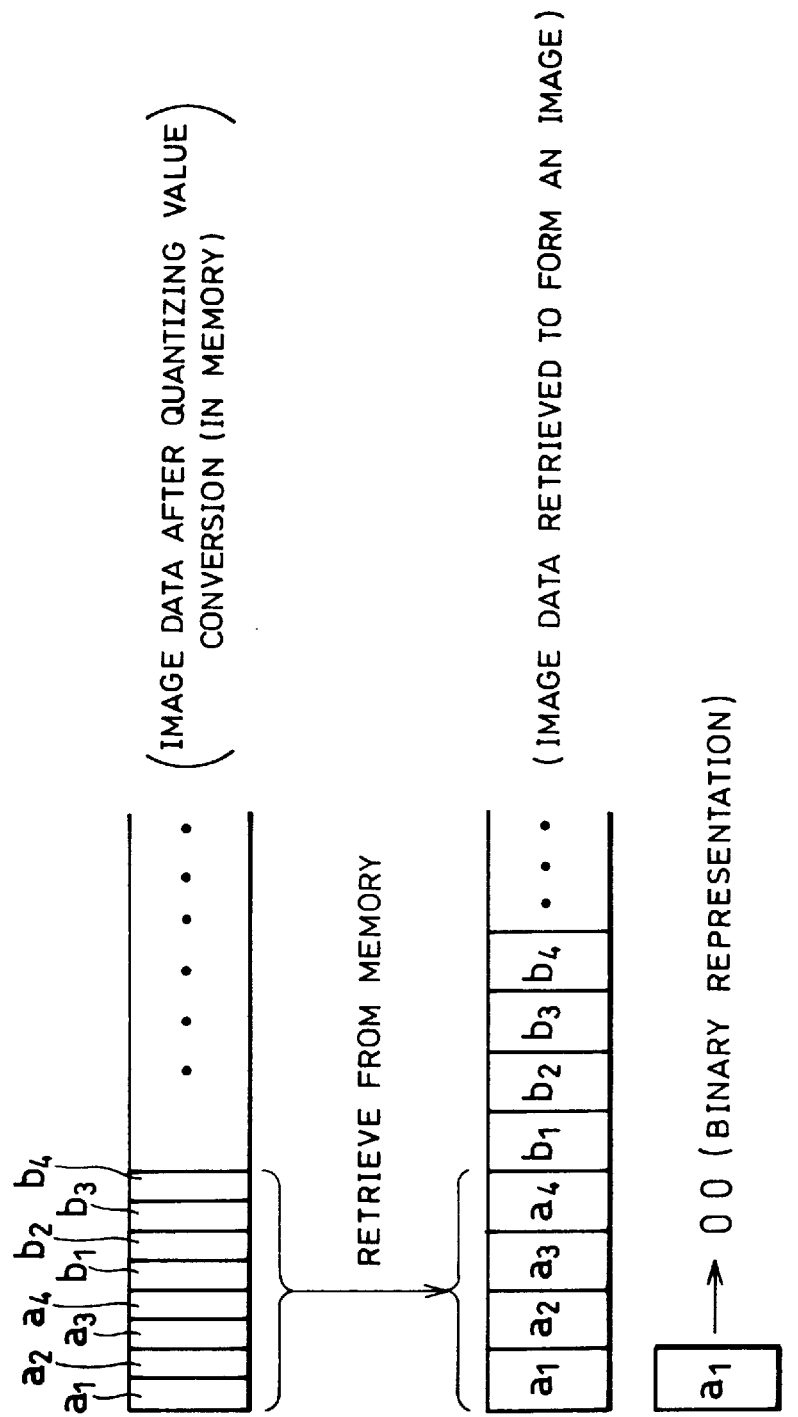
FIG. 23 is a view explaining image data obtained by compressing the image data after the interpolation scaling shown in FIG. 22 to ¼ through quantizing value conversion, and the compressed image data when they are retrieved from the memory for forming an image.

As shown in FIG. 7, let the original image data stored in the memory 54 be image data I and each piece of pixel data in the original image data I be 8 bits. Then, the pixel data are steadily retrieved in the main scanning direction to go through the scaling processing. Herein, let the enlarged-scaling magnification n specified by the operator be 2, and the magnification for the interpolation scaling m be 4. Then, as shown in FIG. 22, when the pixel data retrieved from the memory 54 are aligned A, B, C, D, . . . in alphabetical order from left to right, the data enlarged four times by the interpolation scaling will be $A_1, A_2, A_3, A_4, B_1, B_2, B_3, B_4$, . . . . Subsequently, these data are compressed to 1/m or less, i.e., ¼ or less, as shown in FIG. 23 through quantizing value conversion using the error diffusion processing so as not to degrade the image quality. For example, the data $A_1, A_2, A_3, A_4, B_1, B_2, B_3, B_4, \ldots$ will be $a_1, a_2, a_3, a_4, b_1, b_2, b_3, b_4$, . . . , which are stored in the memory 54 at the storage region where the original image data were stored. Each piece of the data $a_1, a_2, a_3, a_4, b_1, b_2, b_3, b_4, \ldots$ are 2 bits, and for example, a data amount of $(a_1+a_2+a_3+a_4)$ equals to a data amount (8 bits) of the data A shown in FIG. 22. Therefore, the data $a_1, a_2, a_3, a_4, b_1, b_2, b_3, b_4, \ldots$ do not demand any extra storage region, and therefore, can be stored within the storage region where the data A and B . . . were stored.

In case that the original one pixel is 8-bit data and the enlarged image data are compressed to 1/m, the image processing CPU 55, when forming an image based on the image data thus stored in the memory 54, retrieves 8/n-bit data as the data for one pixel from the memory 54. To be more specific, given m=4 and n=2, the image processing CPU 55 computes Equation (A) above and retrieves 4-bit data $(a_1+a_2)$, equivalent to the data for two pixels after the compression, as the data for one pixel. Thus, when an image is formed based on the image data thus retrieved, the resulting image is enlarged two times with respect to the original image on the document as was initially specified.

Note that, when the image data are compressed to 1/m' which is less than 1/m (m'≧m), the image processing CPU 55 also retrieves 16/m'-bit data as the data for one pixel from the memory 54 to form an image.

As has been explained, in the digital copying machine 10 of the present embodiment, the image data enlarged m times by the interpolation scaling are compressed to 1/m or less, and stored in the memory 54 within the storage region where the original image data were stored. Thus, the image data after the interpolation scaling are stored in the memory 54 at a storage region not larger than the one where the original image data were stored. Therefore, it is no longer necessary to increase a capacity of the memory 54, and hence, the costs can be saved.

An amount of interpolation increases in accordance with an enlarged-scale magnification in the interpolation scaling, and since the image data are interpolated at magnification m which is larger than a magnification n specified by the operator, the image data are subject to the smoothing processing as a result. The smoothing processing is carried out to add half-tone levels to render the resulting image excellent half-tone representation, thereby realizing a smooth edge without irregularity.

(Third Embodiment)

Referring to FIGS. 4, 21, and 24 through 28, the following description will describe a further example embodiment of the present invention. Hereinafter, like components are labeled with like reference numerals with respect to the above embodiments, and the description of these components is not repeated for the explanation's convenience.

The digital copying machine 10 of the present embodiment is of the structure shown in FIG. 4 and carries out the interpolation scaling processing detailed by the flowchart of FIG. 21 except that, after the data are processed by the interpolation scaling and compressed through quantizing value conversion, the resulting data are stored in the memory storage region where the original image data were stored irrespective of their mapping position in the original image data in S45.

Figure 24:
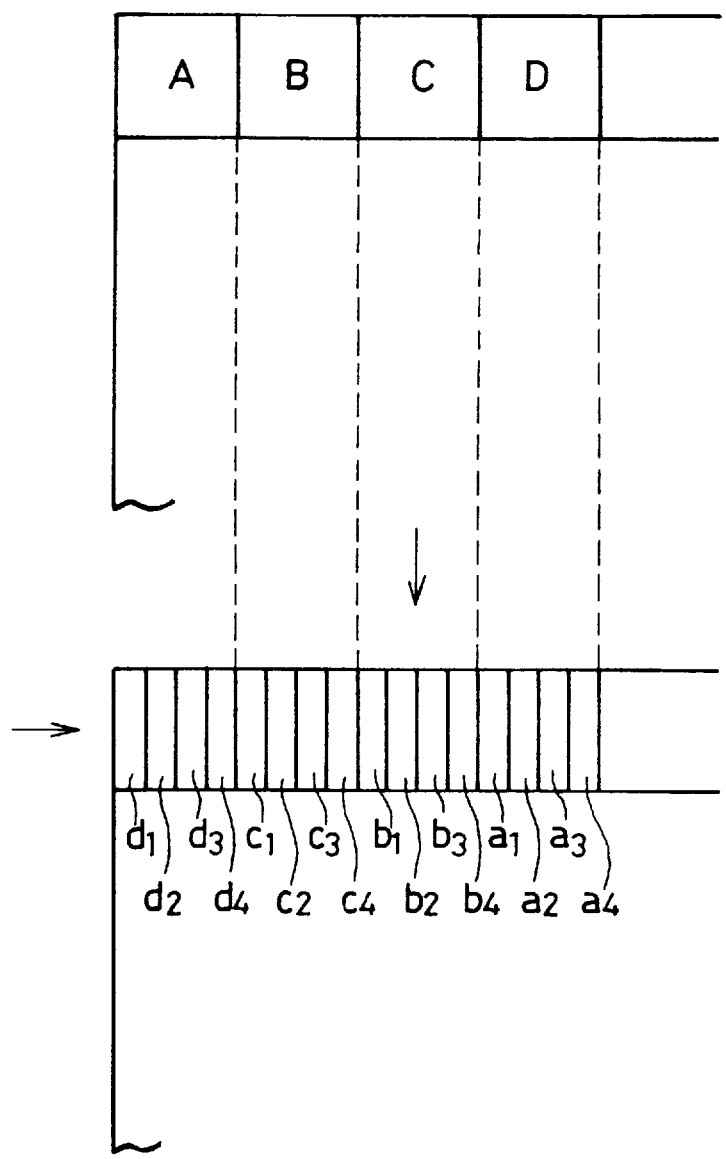
FIG. 24 is a view explaining another embodiment of the present invention, and shows the original image data stored in the memory in a manner shown in FIG. 7 and the image data after the interpolation scaling and stored in a storage region where the original image data were stored.

To be more specific, when the original image data A, B, C, and D . . . are stored in the memory 54 as shown in the upper portion of FIG. 24, the data are enlarged, for example, four times through the interpolation scaling as $A_1, A_2, A_3, A_4, B_1, B_2, B_3, B_4, \ldots$ as shown in FIG. 22. Here, each piece of data are 8 bits and the data are compressed to ¼ through quantizing value conversion. Thus, the enlarged image data are compressed to 2-bit data, $a_1, a_2, a_3, a_4, b_1, b_2, b_3, b_4, \ldots$. The compressed data are stored in the storage region where the original image data were stored in the manner illustrated in the lower portion of FIG. 24: a unit of data $d_1$–$d_4$ is stored in the region where the original data A were stored; a unit of data $c_1$–$c_4$ is stored in the region where the original data B were stored; a unit of data $b_1$–$b_4$ is stored in the region where the original data C were stored; and a unit of data $a_1$–$a_4$ is stored in the region where the original data D were stored. The units of data are stored in this manner by simply shifting their addresses in the memory 54. When an image is formed, 2-bit data, or data of two pixels after the interpolation scaling, are retrieved from the memory 54 as the data for one pixel data.

Figures 25A, 25B, 25C, 26:
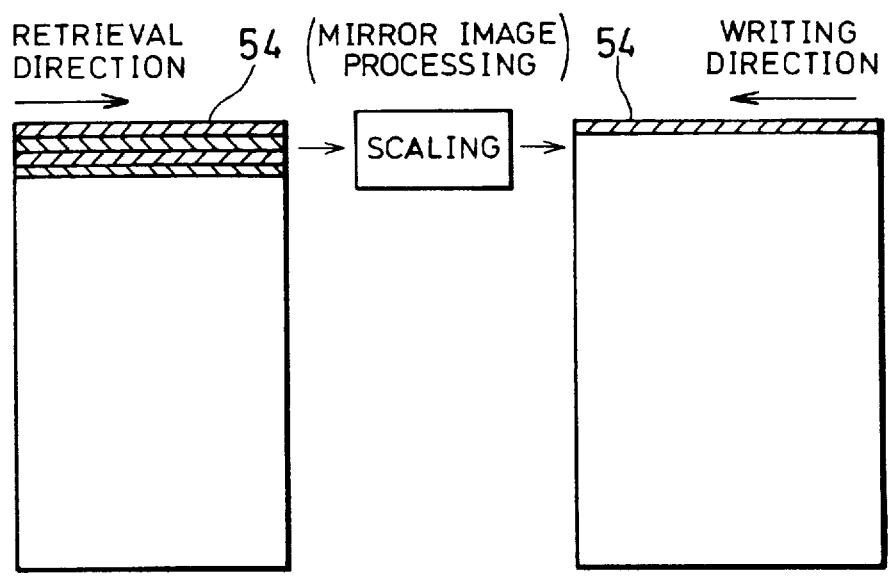
FIG. 25(a) is a view explaining a structure of an address counter of a data memory access controller for steadily retrieving the image data stored in a state shown in the lower portion of FIG. 24.
FIG. 25(b) is a view explaining input addresses.
FIG. 25(c) is a view explaining output addresses in response to the input addresses through the structure shown in FIG. 25(a)
FIG. 26 is a view explaining example mirror image processing by the digital copying machine of FIG. 24.
Figure 27:
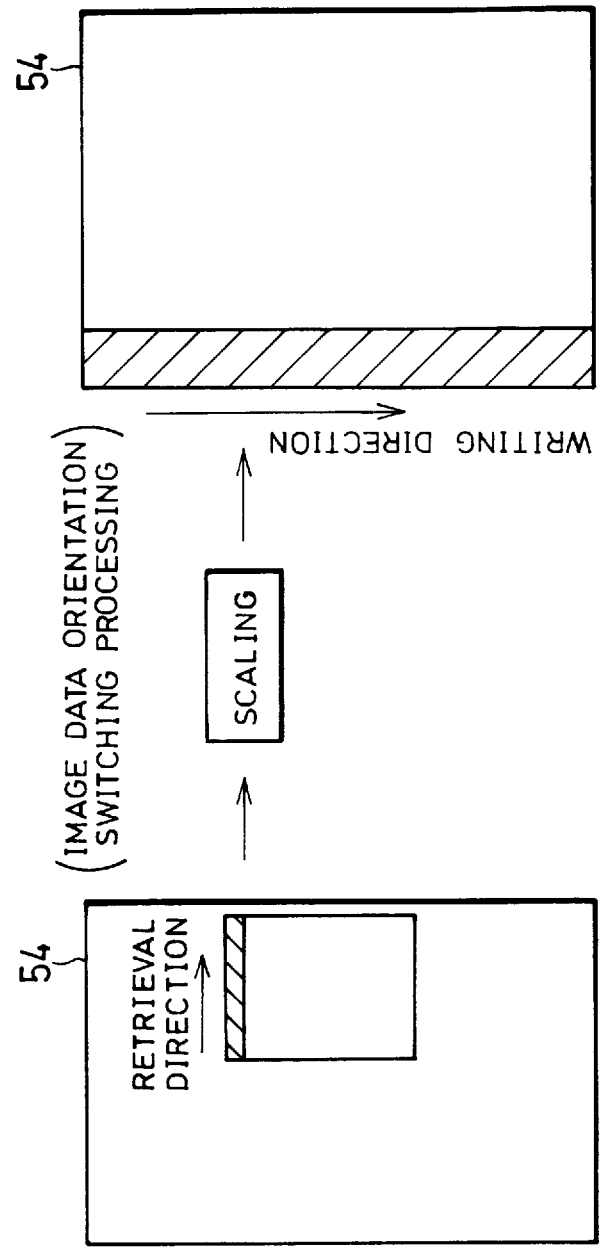
FIG. 27 is a view explaining example image orientation switching processing by the digital copying machine of FIG. 24.

To output the units of data $d_1$–$d_4$, $c_1$–$c_4$, $b_1$–$b_4$, and $a_1$–$a_4$ stored in this order in the memory 54 in a reversed order, the access to the memory 54 is switched by a DMAC (Data Memory Access Controller) that actually retrieves the data from the memory 54. The DMAC is installed in the image processing CPU 55. To be more specific, as shown in FIG. 25(a), inverter circuits are additionally provided to the 0'th bit and 1'st bit of the address counters of the DMAC. That is to say, according to the arrangement of FIG. 25(a), input addresses of FIG. 25(b) are outputted as shown in FIG. 25(c).

Figure 28:
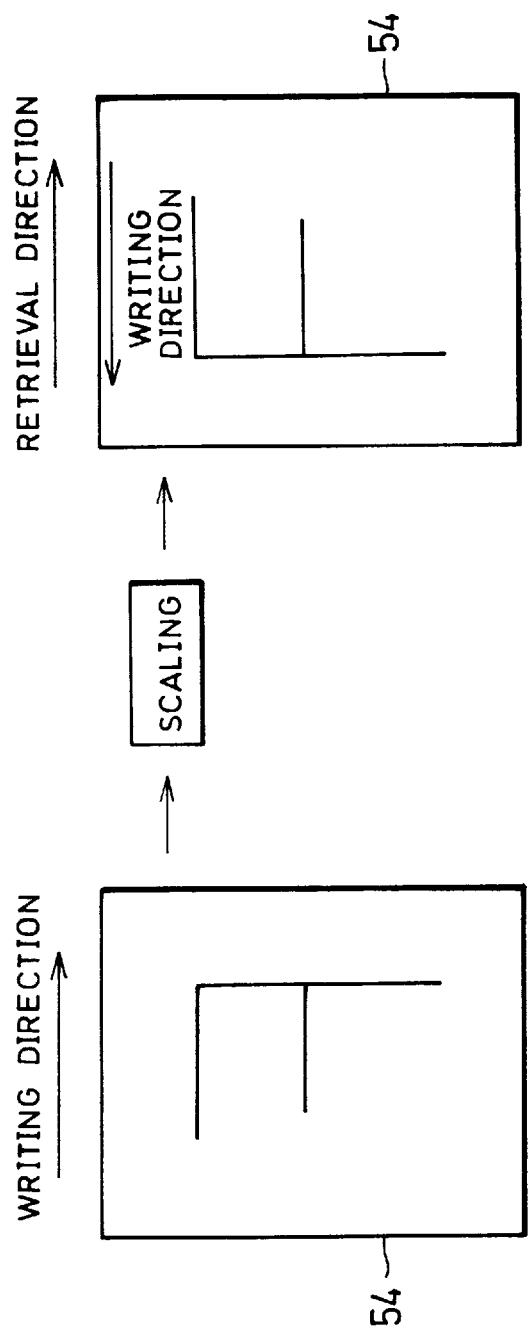
FIG. 28 is a view explaining another example mirror image processing by the digital copying machine of FIG. 24.

The units of data can be aligned in the same order in which the data will be retrieved from the memory 54 when an image is formed in case of image orientation switching, mirror image processing, etc. In case of the mirror image processing, the data are stored in the memory 54 in the order shown in FIG. 26. In case of the image orientation switching, the data are stored in the memory 54 in the order shown in FIG. 27. In these two cases, the calculation of the data retrieving order can be omitted, thereby speeding up the retrieval of the image data from the memory 54. For example, as shown in FIG. 28, when the data are read in two directions by the scanner unit 11, the data may be inputted into the memory 54 as shown in the left-hand portion of the drawing. When the retrieved data are re-aligned as shown in the right-hand portion of the drawing after the scaling, the data are retrieved in the normal direction to facilitate the data processing when the image is printed, thereby speeding up the processing.

(Fourth Embodiment)

Referring to FIGS. 4, 6 through 8, and 29 through 32, the following description will describe still another example embodiment of the present invention. Hereinafter, like components are labeled with like reference numerals with respect to the above embodiments, and the description of these components is not repeated for the explanation's convenience.

Figure 29:
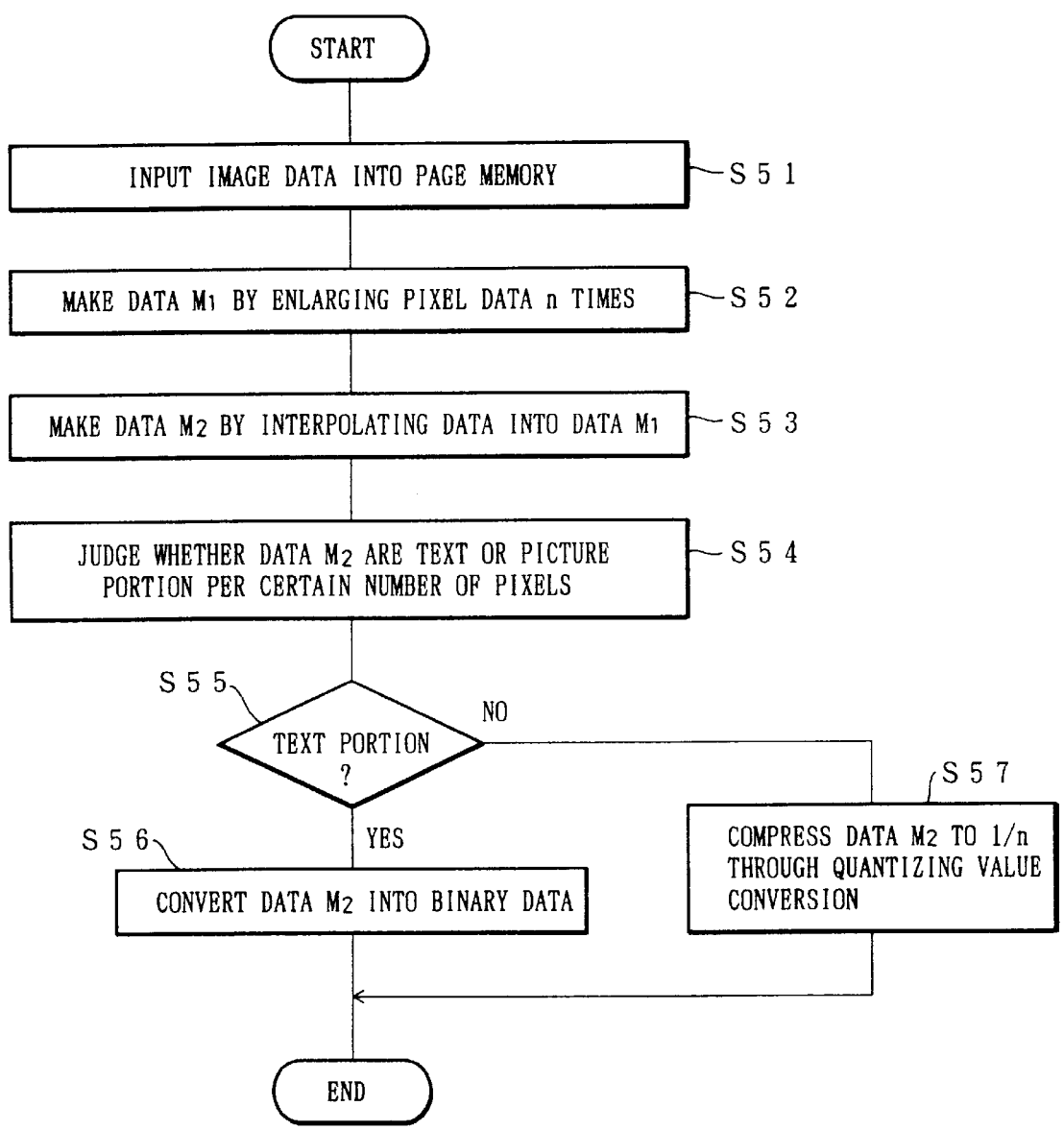
FIG. 29 shows a flowchart detailing an operation sequence of a digital copying machine in accordance with still another embodiment of the present invention, and it shows an operation sequence from the image data enlarged-scaling processing to recording into a memory.

The digital copying machine 10 of the present invention is of the structure shown in FIG. 4; however, it carries out an operation detailed by the flowchart of FIG. 29 when storing the image data into the memory 54 after the interpolation scaling. Herein, assume that the image data are enlarged n (>1) times as the operator specifies in the interpolation scaling.

Like the flowchart of FIG. 1, the image data of a document read by the scanner unit 20 are stored in the memory 54 first (S51). Then, the image data stored in the memory 54 are enlarged n times by the scaling processing section 52d of the image data processing section 52 (S52). Hereinafter, the enlarged image data are referred to as $M_1$ for the explanation's convenience.

The image data in the memory 54 are enlarged in S52 in the manner illustrated in FIG. 6. To be more precise, the image data are steadily inputted into the scaling processing section 52d from those of the head pixel $P_1$ indicated by shade. Then, N-bit data forming one pixel are enlarged n times and temporarily stored in a line memory of the scaling processing section 52d. Interpolation processing is carried out at the same time as the scaling processing (S53). Thus, the data $M_1$ are converted into data $M_2$ as a result of the interpolation processing.

Then, the data $M_2$ are checked whether they are a text portion or picture portion (half-tone level) per certain number of pixels (S54). The text portion referred herein includes characters, lines, edge portion of an image, etc., where the density is uniform and high in the image. The picture portion referred herein is a half-tone level portion where the density varies in levels.

When the data $M_2$ in the subject region are judged to be the text portion (S55), the data $M_2$ are converted into binary data using a predetermined threshold $TH_1$ by the error diffusion processing section 52f (S56). On the other hand, when the data $M_2$ in the subject region are judged to be the picture portion, the data $M_2$ are reduced to, for example, 1/n, through quantizing value conversion by the error diffusion processing section 52f (S57). In other words, the data $M_2$ are compressed in such a manner that the compressed data $M_2$ will be stored in the memory 54 within a storage region smaller than the one demanded to store the original image data when the same are enlarged to an initially specified magnification for an output image. After the processing by the error diffusion processing section 52f, the image data were stored in the storage region where the original image data I were stored in the memory 54. Here, the data $M_2$ are reduced to 1/n' (n'≧n).

Then, assume that one pixel of the original image data are N bits, then, according to Equation (A) above, N/n'-bit data are retrieved from the memory 54 as the image data of one pixel of the picture portion. Whereas 1-bit data are retrieved from the memory 54 as the image data of one pixel of the text portion. An image is formed based on the image data retrieved in the above manner.

According to the above processing, the data amount of the text portion can be reduced, thereby making it possible to further reduce an amount of the image data stored in the memory 54, or the image data after the scaling processing. Therefore, it is no longer necessary to increase a capacity of the memory 54, and hence, the costs can be saved.

For further understanding, the interpolation scaling and compression processing will be described more in detail below.

Herein, as shown in FIG. 7, let the image data inputted into the image processing section 50 and stored in the memory 54 be image data I and each pixel of the image data I be 8 bits. To begin with, the pixel data of the image data I are steadily retrieved in the main scanning direction and to go through the interpolation scaling. As shown in FIG. 8, given that n=2 and the pixel data retrieved from the memory 54 are aligned as A, B, C, D, . . . in alphabetical order from left to right, then the data enlarged two times through interpolation scaling will be $A_1$, $A_2$, $B_1$, $B_2$, . . . . Subsequently, the enlarged data are classified into either the text or picture portions. The judgment whether the subject data are the text or picture portion has been carried out by the multi-value processing section 52a in advance. A pixel, if judged to be the text portion, is converted into binary data, thereby forming a 1-bit pixel. On the other hand, a pixel judged to be the picture portion is compressed to ½ in data amount.

Figure 30:
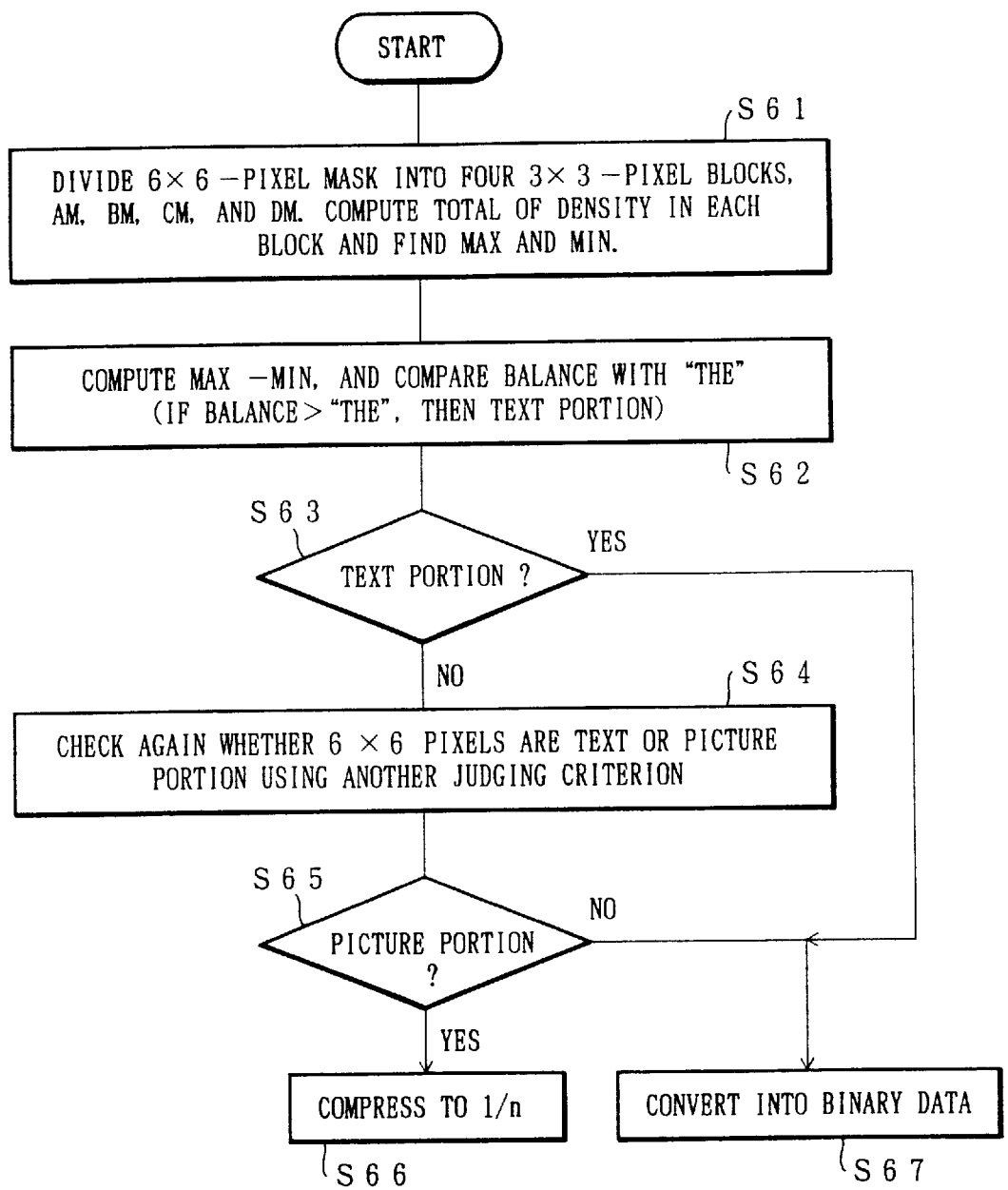
FIG. 30 shows a flowchart further detailing an operation in the flowchart of FIG. 29 for judging whether the subject data are a text or picture portion.
Figure 31:
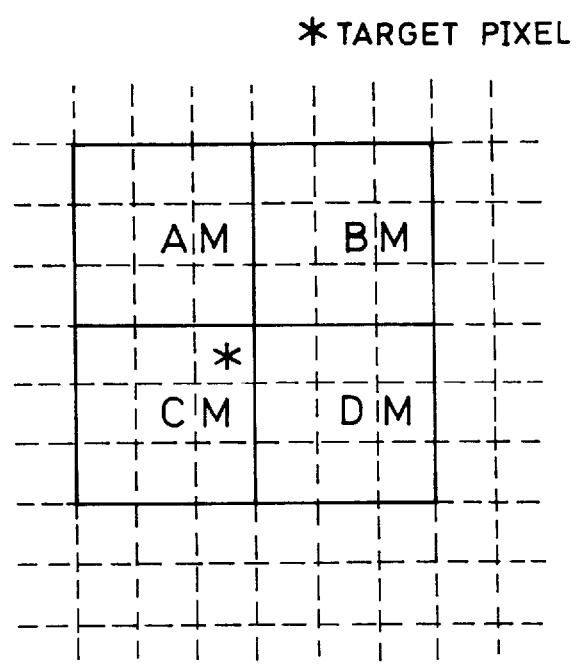
FIG. 31 is a view explaining the judging operation of FIG. 30 for judging whether data in a subject region are a text or picture portion.

Next, the classifying processing and text/picture portion judging processing will be explained with reference to the flowchart of FIG. 30 and FIG. 31.

Herein, 6 lines of image data are processed as one unit. To begin with, 6×6-pixel square are divided into four blocks each made of 3×3 pixels, AM, BM, CM, DM. Then, a total of the density in each block is computed, and the maximum (MAX) and minimum (MIN) of these four totals are computed (S61).

Next, a balance between the MAX and MIN is computed, and whether the balance is larger than a predetermined threshold THE or not is checked (S62). When the balance is larger than THE, the 6×6-pixel square are judged to be the text portion (S63), and in case of the text portion, the pixel data in the 6×6-pixel square are converted into binary data (S67).

On the other hand, when the 6×6-pixel square are not judged to be the text portion in S63, then the same is checked again whether it is the text or picture portion using another judgment criterion (S64). The above judgement criterion is, for example, illustrated in FIGS. 32(a) and 32(b). To be more precise, it is checked whether or not the alignment of the density values of the pixel data E, F, A, B, C, D aligned in this order on one line from left to right as shown in FIG. 32(a) matches with any of the density patterns 1–9 shown in FIG. 32(b) representing the text portion. Thus, if the density value alignment matches with any of the density patterns 1–9, the 6×6-pixel square is judged to be the text portion; otherwise, the same is judged to be the picture portion.

(Fifth Embodiment)

Figure 33:
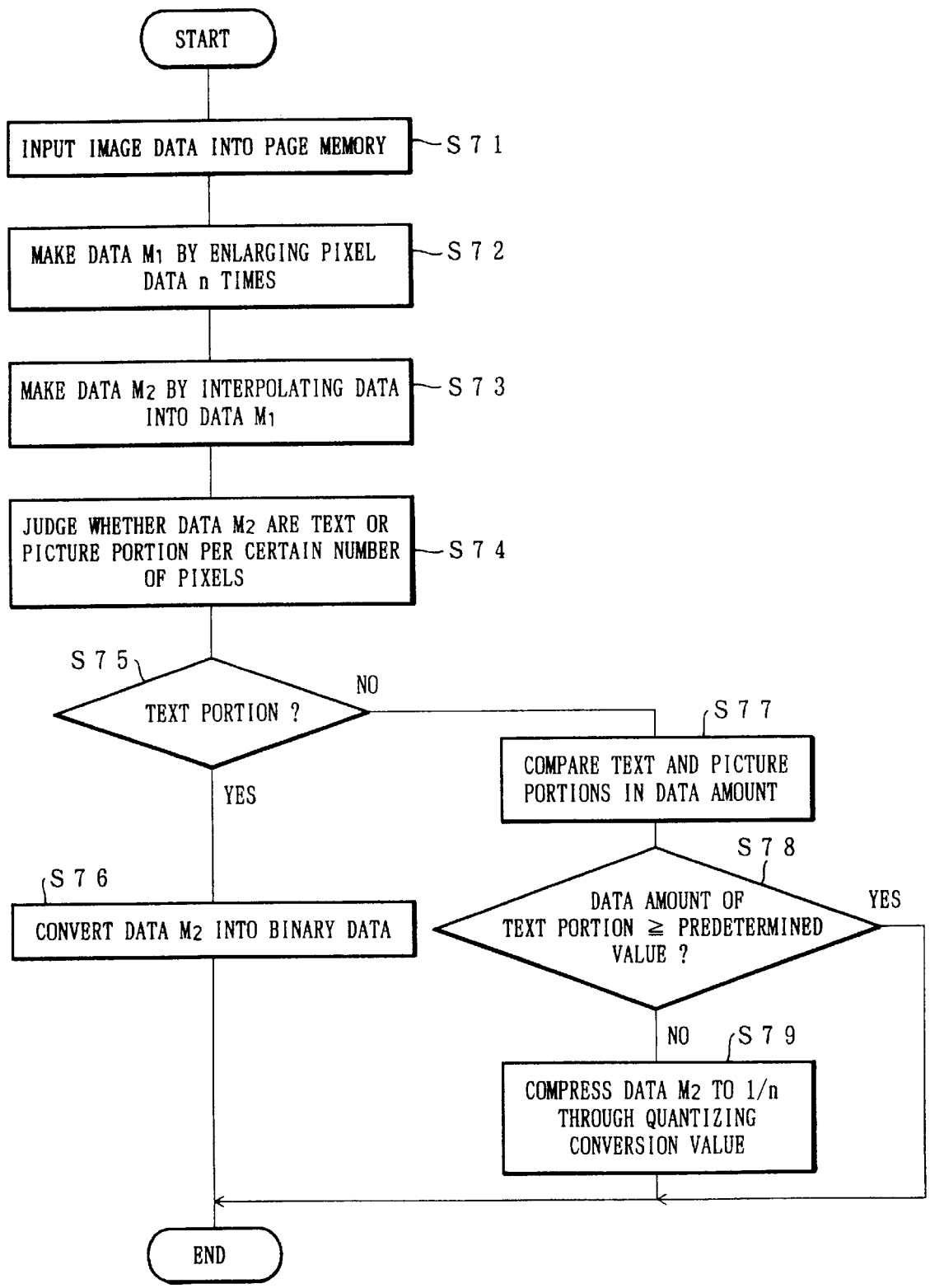
FIG. 33 shows a flowchart detailing an operation sequence of a digital copying machine in accordance with still another embodiment of the present invention, and it shows an operation sequence from the image data enlarged-scaling processing to recording into a memory.

Referring to FIGS. 4, 32, and 33, the following description will describe still another example embodiment of the present invention. Hereinafter, like components are labeled with like reference numerals with respect to the above embodiments, and the description of these components is not repeated for the explanation's convenience.

The digital copying machine 10 of the present embodiment is of the structure shown in FIG. 4; however, it carries out the operation as detailed by the flowchart of FIG. 33 when storing the image data in the memory 54 after the interpolation scaling. S71 through S76 of FIG. 33 are identical with S51 through S56 of FIG. 29 and only S77 through S79 are different from the flowchart of FIG. 29.

The data $M_2$ are checked whether they are a text or picture portion per certain number of pixels (S74). S74 is carried out, for example, per unit having six pixels aligned on one line in the main scanning direction as shown in FIG. 32(a). When a unit is judged to be the text portion (S75), the pixel data thereof are converted into binary data (S76).

The pixel data in a unit judged to be the picture portion are withheld in a line buffer of the error diffusion processing section 52f intact. Then, the text and picture portions of the image data stored in the line buffer are compared in data amount (S77). Herein, the comparison is made, in the state of preceding line, that is, before the pixel data of the text portion are converted into binary data. This is done to compute a free capacity in the memory 54 for storing the picture portion. When a ratio of the picture portion to the text portion (which will be converted into binary data) in data amount is lower than a predetermined value (S78), the pixel data of the picture portion are compressed to 1/n or less through quantizing value conversion (S79); otherwise, a data amount of the line buffer increases. Note that the compression magnification used herein is an inverse number of the enlarged-scaling magnification initially specified by the operator. Also, the predetermined value referred herein sets a critical point at which it is determined whether the image data of one line are stored within a region of the memory 54 where the original image data of the corresponding one line were stored without compressing the picture portion(s). Here, the image data are compressed to 1/n' (n'≧n).

On the other hand, when a ratio of the text portion is equal to or larger than the predetermined value, the image data of the picture portion are stored in the memory 54 without being compressed. Because when an amount of the image data of the text portion subject to conversion into binary data is equal to or larger than the predetermined value, the line buffer withholds less amount of data, thereby making it unnecessary to compress the data of the picture portion.

Assume that one pixel of the original image is N bits, then N/n-bit data are retrieved from the memory 54 as the image data of one pixel for the image data of the picture portion compressed by the error diffusion processing section 52f. Whereas N-bit data are retrieved from the memory 54 as the image data of one pixel for the image data of the picture portion stored intact. As for the image data of the text portion, 1-bit data are retrieved from the memory 54. An image is formed based the image data thus retrieved.

As has been explained, when the storage means has a sufficient free capacity, the image data of the half-tone level portion are stored therein without being compressed; otherwise, the image data of the half-tone level portion are compressed. As a result, a data amount can be reduced in the picture portion as well as the text portion. Thus, it has become possible to further reduce the image data amount to be stored in the memory 54 after the scaling processing without degrading the quality of the entire picture portions. Therefore, it is no longer necessary to increase a capacity of the memory 54, and hence, the costs can be saved while maintaining the image quality.

(Sixth Embodiment)

Referring to FIGS. 34 through 37, the following description will describe still another example embodiment of the present invention. Hereinafter, like components are labeled with like reference numerals with respect to the above embodiments, and the description of these components is not repeated for the explanation's convenience.

Figure 34:
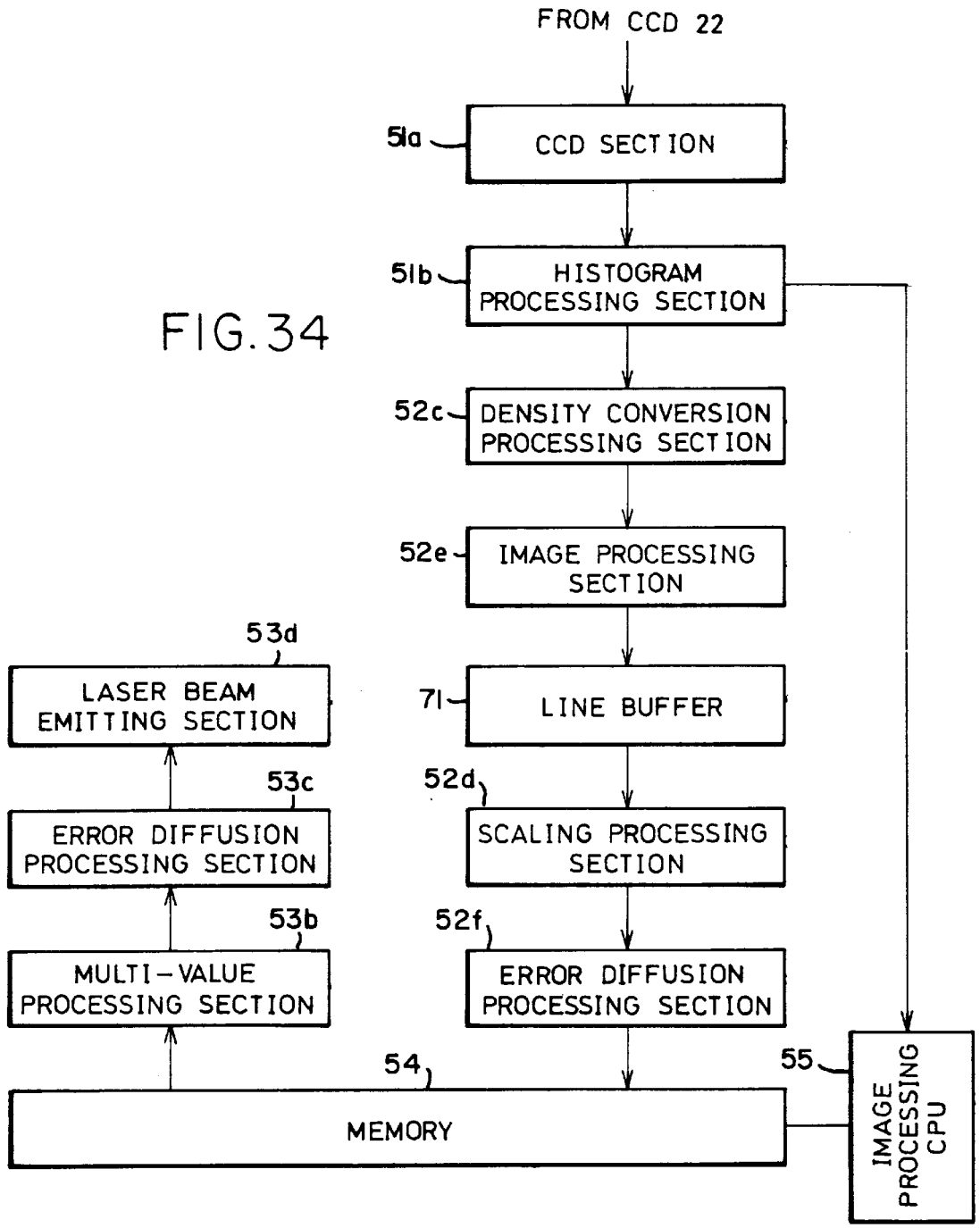
FIG. 34 is a block diagram depicting a structure of an image processing section of a digital copying machine in accordance with still another embodiment of the present invention.

The digital copying machine 10 of the present invention is of the structure shown in FIG. 2 except that the image processing section 50 has a structure depicted in FIG. 34. In other words, the image data inputted into the image processing section 50 are scaled by a line buffer 71 and the scaling processing section 52b before they are stored in the memory 54.

Figure 35:
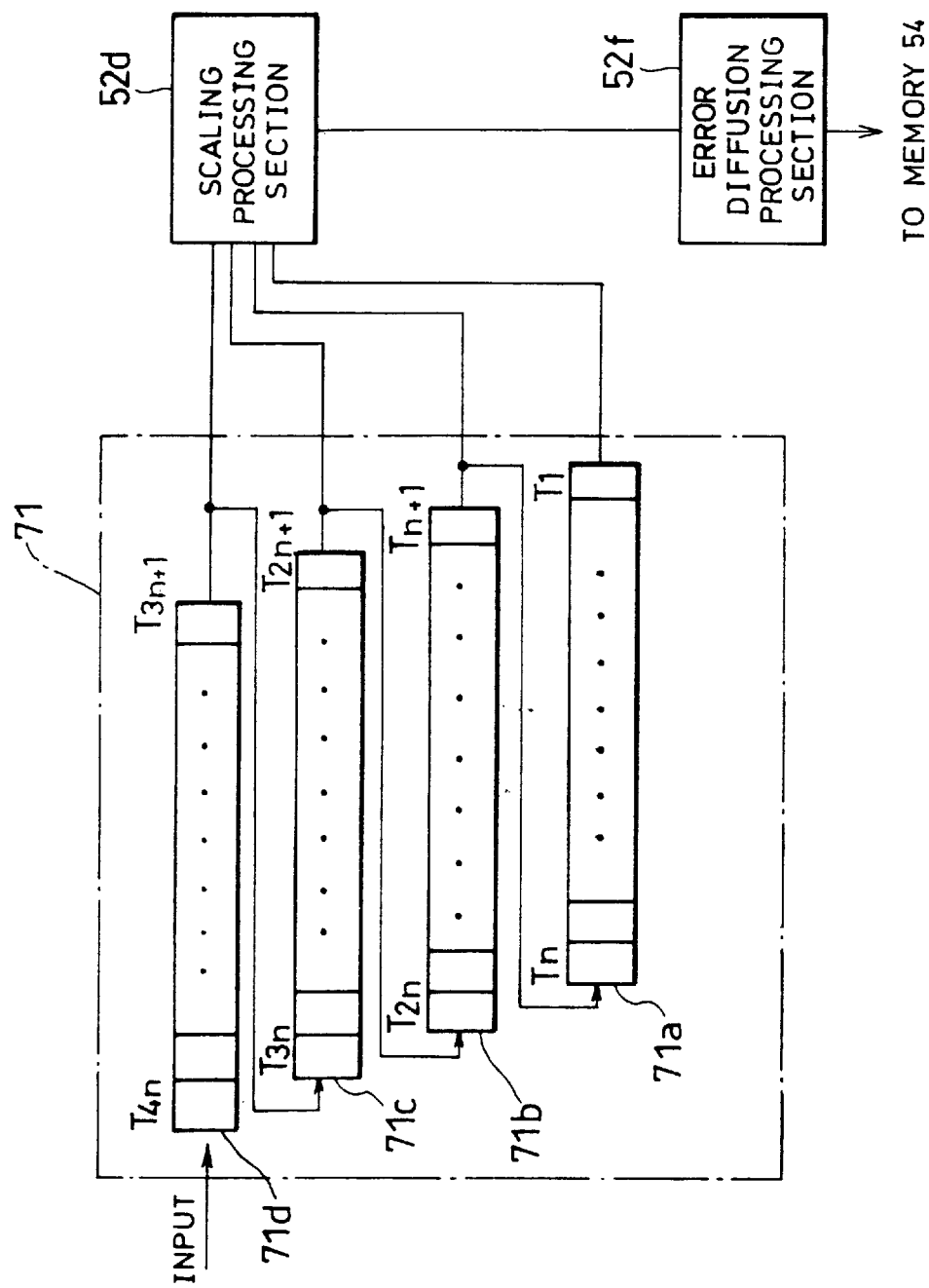
FIG. 35 is a block diagram further depicting the structure of FIG. 34 partially, and it shows a portion from a line buffer to a scaling processing section.

FIG. 35 depicts the partial structure covering a portion from the line buffer 71 to the scaling processing section 52d. The line buffer 71 includes, for example, first through fourth line buffers 71a through 71d, which are connected in serial in alphabetical order. Also, each of the first through fourth line buffers 71a through 71d is directly connected to the scaling processing section 52d.

According to the above arrangement, the image data inputted from the CCD 22 are processed by the histogram processing section 51b, density conversion processing section 52c, and image processing section 52e and inputted into the line buffer 71. Herein, let the image data be the image data I shown in FIG. 7, and each piece of pixel data are 8 bits. The pixel data are steadily retrieved in the main scanning direction and inputted into the line buffer 71 shown in FIG. 35 from those of the top. Each of the first through fourth line buffers 71a through 71d can withhold the image data of n pixels.

In the drawing, $T_1$–$T_{4n}$ indicate time, and the data positioned at $T_{4n}$ are $T_{4n}$ time behind from those at $T_1$. Therefore, the pixel data at the top of each of the first through fourth line buffers 71a through 71d are inputted into the scaling processing section 52d at the same time. When the line buffer 71 becomes empty, the following data are steadily inputted from the fourth line buffer 71d side. When the first through fourth line buffers 71a through 71d withhold the data to their full, the data are supplied to the scaling processing section 52d from the line buffer 71 in the manner explained above.

The scaling processing section 52d, carries out, for example, the simple scaling explained above. To be more specific, when the input data are to be enlarged n times, for example, two times as shown in FIG. 8, the original data A, B, C, D, . . . will be $A_1$, $A_2$, $B_1$, $B_2$, . . . . No interpolation is carried out here because this is the simple scaling. Then, the scaled data are reduced to 1/n, for example, ½, by the error diffusion processing section 52f through quantizing value conversion. The compressed data will be $a_1$, $a_2$, $b_1$, $b_2$, . . . as shown in FIG. 9. Each piece of the compressed pixel data are 4 bits. The compressed data are temporarily stored in the memory 54. Herein, the data are compressed to 1/n'

($n' \geq n$). The pixel data are retrieved from the memory 54 in the manner as described above. Note that the pixel data are steadily retrieved and processed until the line buffer 71 has stored the processed image data to its full, to be more specific, if the memory 54 is a page memory and it has stored the image data for the full one page, then, the image data stored in the memory 54 are retrieved to be outputted.

As has been explained, with the digital copying machine 10 of the present embodiment, the image data after the interpolation scaling are stored within a storage region not larger than the one where the original image data were stored in the memory 54. Thus, it is no longer necessary to increase a capacity of the memory 54, and therefore, the costs can be saved.

Also, with the digital copying machine 10 of the present embodiment, the input image data in the image processing section 50 are scaled by the scaling processing section 52d and compressed by the error diffusion processing section 52f before they are stored in the memory 54. The scaling and compression processing is carried out per some lines using the line buffer 71. That is to say, the image data of each line are inputted steadily, and scaled first and thence compressed steadily as well to be stored in the memory 54. This arrangement can speed up the processing compared with a case where the image data of one full page are stored in the memory 54 first, and thence retrieved steadily to be scaled and compressed, because a time waiting for the memory 54 to store the image data to its full can be saved.

Figure 36:
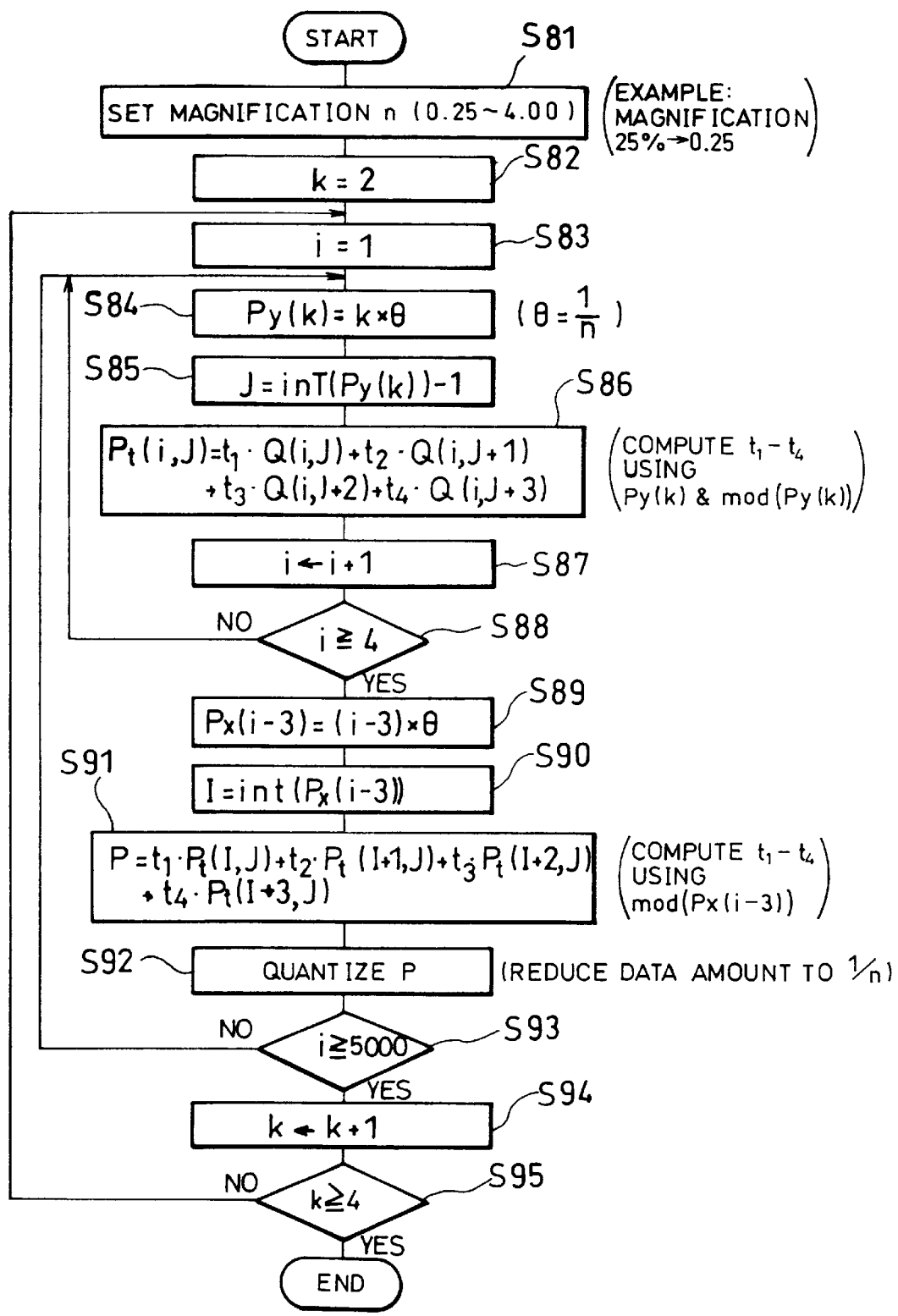
FIG. 36 shows a flowchart detailing interpolation scaling processing by the scaling processing section of FIG. 35.
Figure 37:
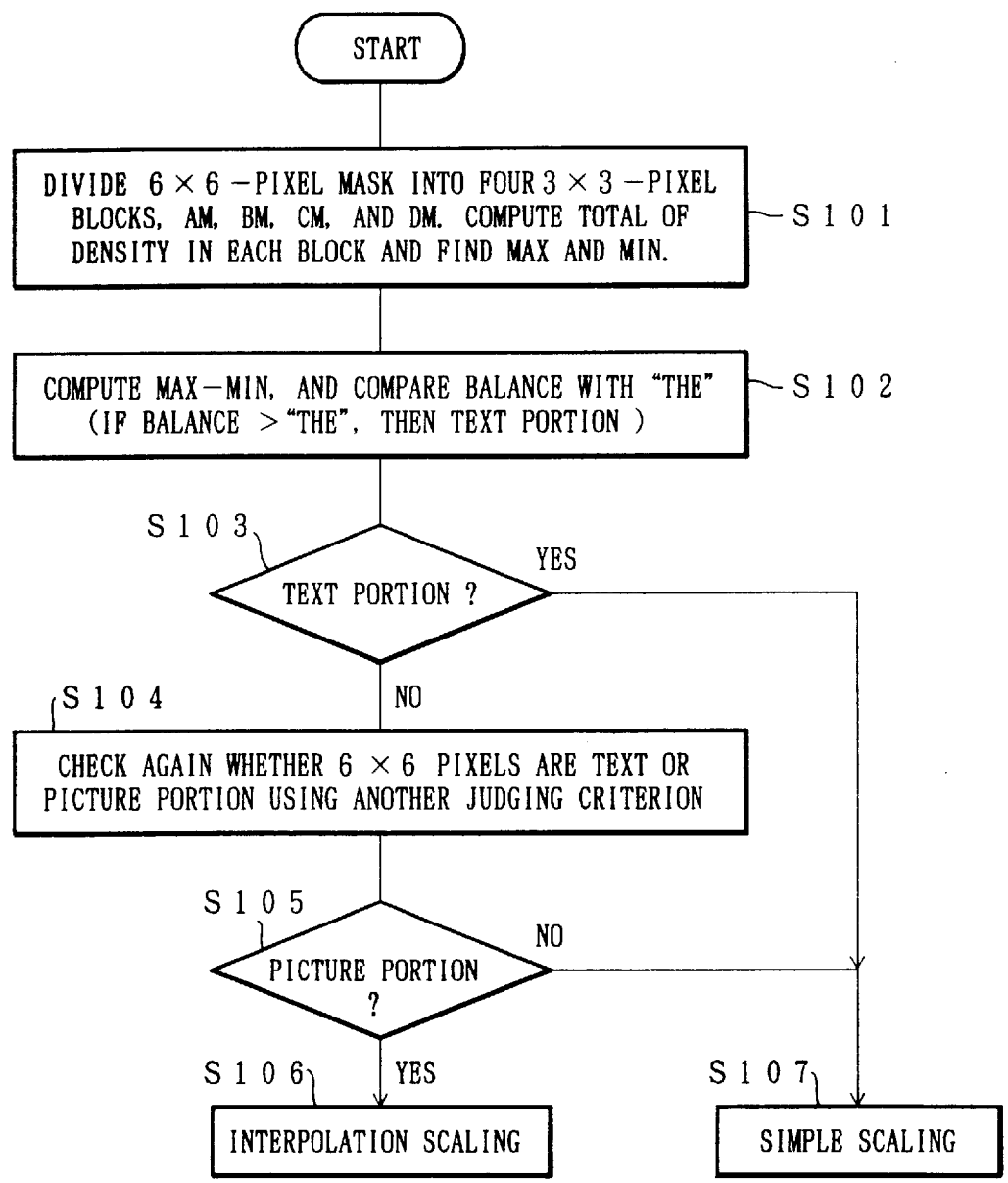
FIG. 37 shows a flowchart detailing classifying processing carried out before the processing by the scaling processing section, and scaling processing in accordance with the result of the classifying processing.

Note that the scaling processing section 52d carries out the simple scaling in the description above, but it may carry out the interpolation scaling, which is detailed by the flowchart of FIG. 36. In the drawing, S81–S94 are identical with S21–S34 of FIG. 17 and the explanation of the same are omitted herein. Since the line buffer 71 of FIG. 35 is a 4-line buffer, S81–S94 are repeated until $k \geq 4$ in S95 of the flowchart of FIG. 36, and the processing ends when $k \geq 4$ to start again with other 4 lines.

Before the image data are scaled by the scaling processing by the scaling processing section 52d, the image data may be classified into either the text or picture portions to subject the text portions to the simple scaling while the picture portion to the interpolation scaling. The classification is carried out by the image processing section 52e of FIG. 34 in the manner of the flowchart of FIG. 37. In the drawing, S101 through S105 are identical with S61 through S65 of FIG. 30.

According to this processing arrangement, the text portion is subject to the simple scaling. Thus, the processing can be sped up compared with the case where all the image data are subject to interpolation scaling. Whereas the picture portion is subject to the interpolation scaling. This is because the quality is a crucial factor for the picture portion, and the interpolation scaling can keep the image quality in the picture portion at a satisfactory level.

(Seventh Embodiment)

Referring to FIGS. 4, 38 through 45, the following description will describe still another example embodiment of the present invention. Hereinafter, like components are labeled with like reference numerals with respect to the above embodiments, and the description of these components is not repeated for the explanation's convenience.

The digital copying machine 10 of the present embodiment is of the structure shown in FIG. 2 and the image processing section is structured as depicted in FIG. 4 but the scaling processing section 52d carries out smoothing processing before the scaling processing. In the smoothing processing, a half-tone value is given to the image edge portion to make the image density vary in a smooth manner when the image data are compressed by the error diffusion processing section 52f through quantizing value conversion.

The smoothing processing is illustrated in FIG. 38(a). In the drawing, the left-hand portion shows the density of each pixel of the image data while the right-hand side shows the density of each pixel after the smoothing processing. To be more specific, the mask processing is carried out mainly using a target pixel ⑤ shown in FIG. 38(b), and an average density of the pixels within the masking region is used as the density of the target pixel ⑤. Herein, an average density of nine pixels (pixels ①–⑨) is used as the density of the target pixel ⑤. An alternative is shown in FIG. 39. Herein, the masking size is set in accordance with a magnification. For example, when a magnification is ½, one pixel disappears in every two pixels as a result of the compression processing. Thus, the masking size must be larger than an area covered by two pixels.

As a result of the smoothing processing, density data are given to a pixel mapping on an original pixel which had no density (0). Thus, even if the image data are compressed by the error diffusion processing section 52f, the density varies in a smooth manner in the resulting image data.

Figure 40:
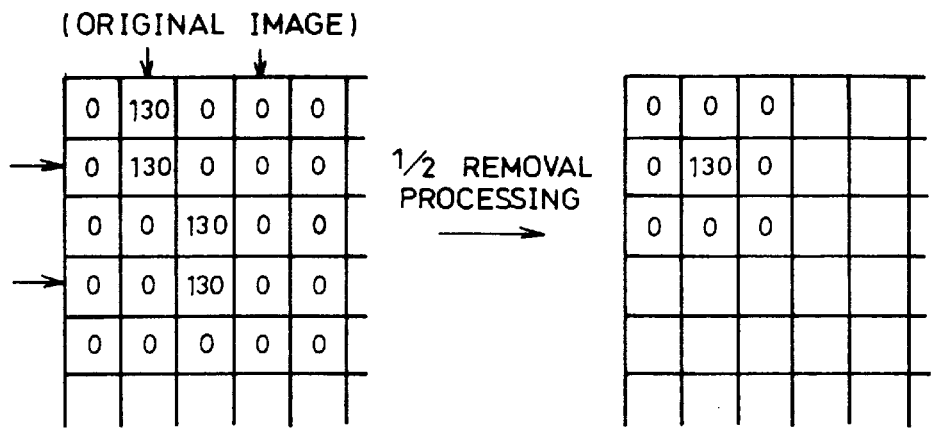
FIG. 40 is a view explaining typical compression processing.

When the smoothing processing is carried out before the reduction processing in the simple scaling by the scaling processing section 52d, the image data will not be erased. To be more specific, if the original image data shown in the left-hand portion of FIG. 40 are reduced to ½ without the smoothing processing, the resulting image data are the ones shown in the right-hand portion. Herein, the original image data are reduced by removing the data of some lines indicated by arrows both in the main scanning and sub-scanning directions. As a result, the resulting reduced image data has quite a small data amount.

Figure 41:
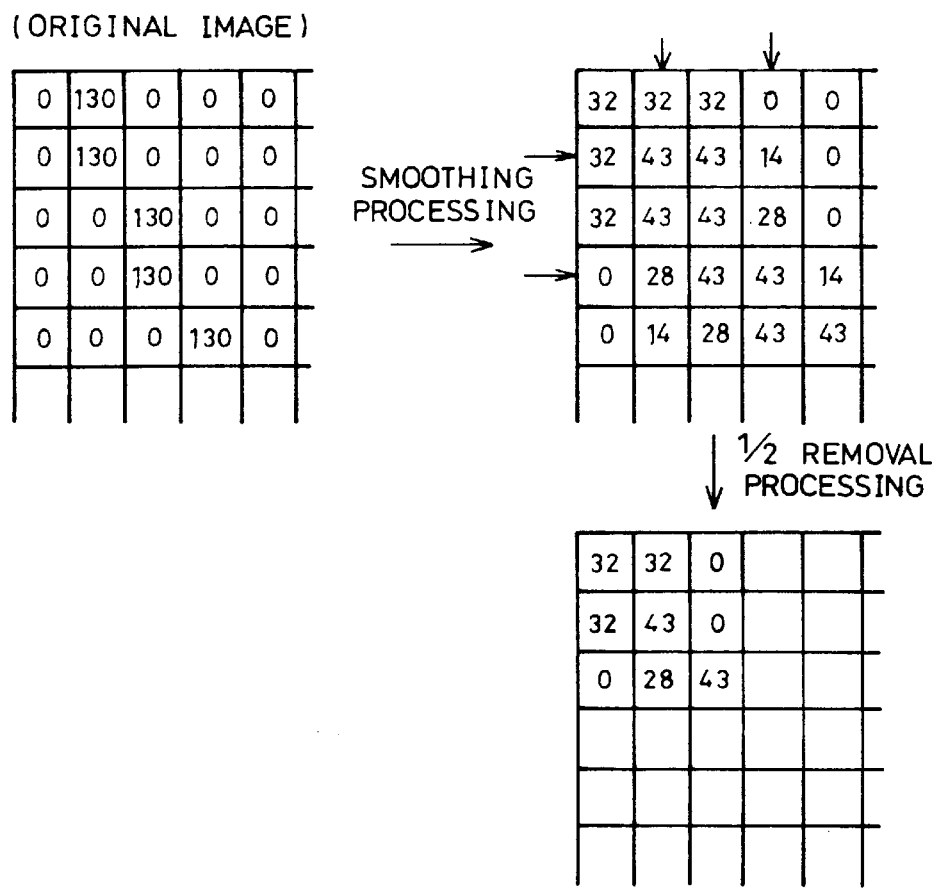
FIG. 41 is a view explaining a difference in the image data when the smoothing processing is carried out before the reduction processing by the digital copying machine of FIG. 38.

In contrast, when the original image data are reduced after the smoothing processing as shown in FIG. 41, more pixels will have density values in a larger area. Thus, when the image data are reduced to ½ after the smoothing processing, the resulting reduced image data has a larger data amount compared with those without the smoothing processing, thereby making it possible to maintain the image quality at a desired level.

In the smoothing processing, the smaller the compression magnification, the larger the area of the masking processing shown in FIG. 38(b). For example, when a reduced-scaling magnification is 50%, two pixels are reduced to one pixel, and the masking size is set to a 2×2-pixel square. Since the data of one line are scaled as the data of three lines, no data will be erased. When a reduced-scaling magnification is 25%, the masking size is set to a 3×3-pixel square, so that the one line are scaled to four lines or more. The relationship between the compression magnification and masking size is set forth below:

| REDUCED-SCALING MAGNIFICATION | MASKING SIZE |
| --- | --- |
| 100–50% | 2 × 2 |
| 49–25% | 3 × 3 |

To prevent the reduction of the image data amount by the compression processing, a following method is also applicable besides the above smoothing processing. In this method, some of the image data are removed using a random number, meaning that the image data are not removed in a periodical manner.

Figure 42:
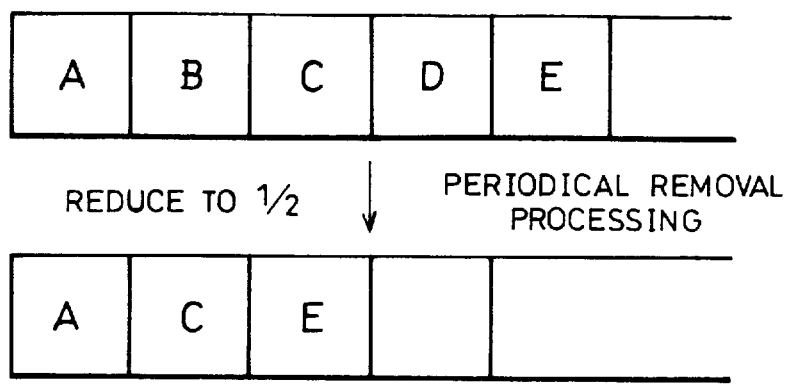
FIG. 42 is a view explaining periodic removal processing when it is carried out for one line in typical reduction processing.
Figure 43:
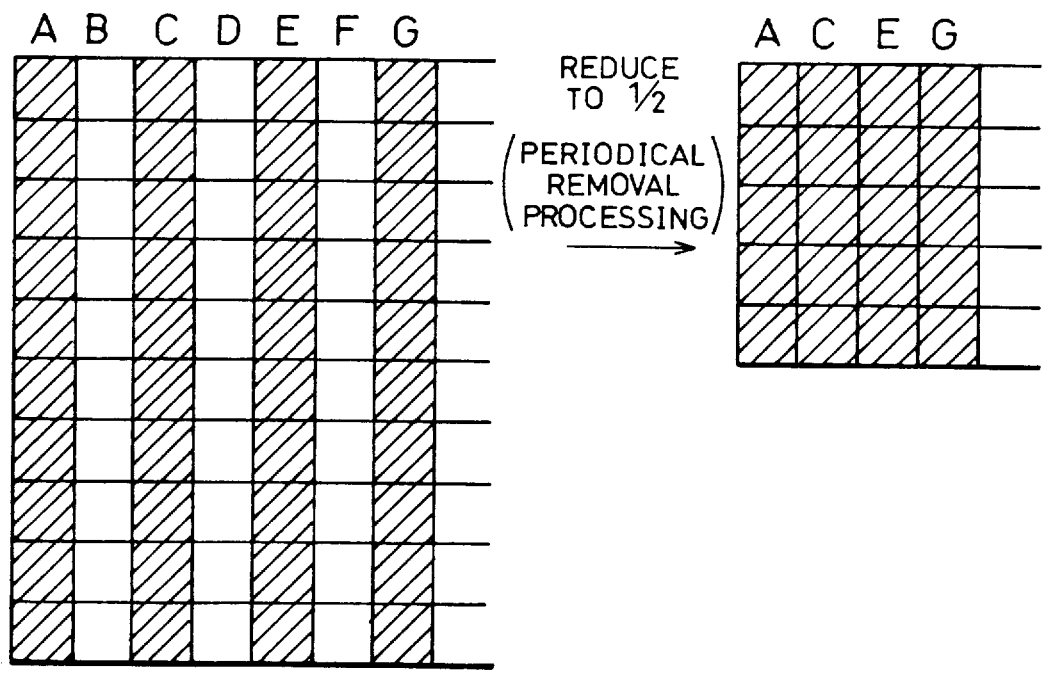
FIG. 43 is a view explaining the removal processing of FIG. 42 when it is carried out for the entire image data.

For example, when the image data whose pixel data A, B, C, D, are aligned in alphabetical order in one line in the main scanning direction as shown in FIG. 42 are compressed to ½ by the simple scaling, removing one line in every other line yields the image data of A, C, E, . . . . Removing one line in every other line in the main scanning direction results in an illustration of FIG. 43. Thus, if the periodical pattern repeats every line, the image will be erased or there may occur moire.

Figure 44:
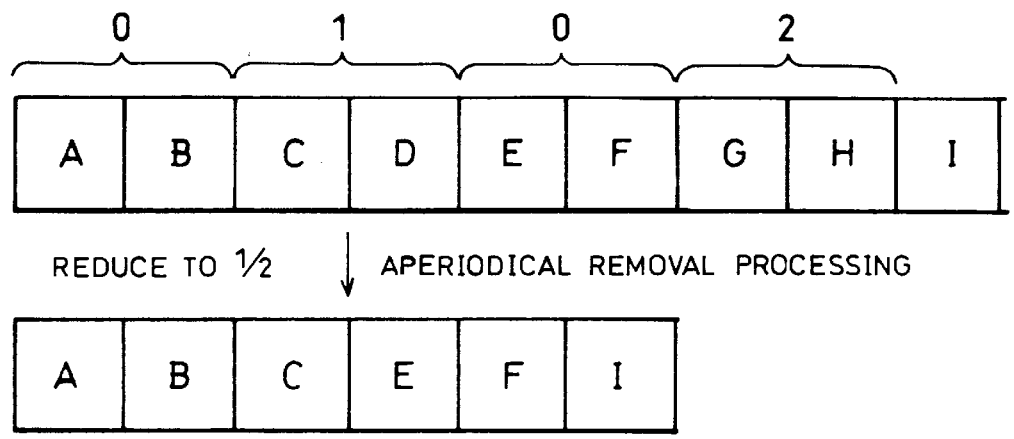
FIG. 44 is a view explaining an aperiodical removal processing when it is carried out for one line instead of the above smoothing processing.
Figure 45:
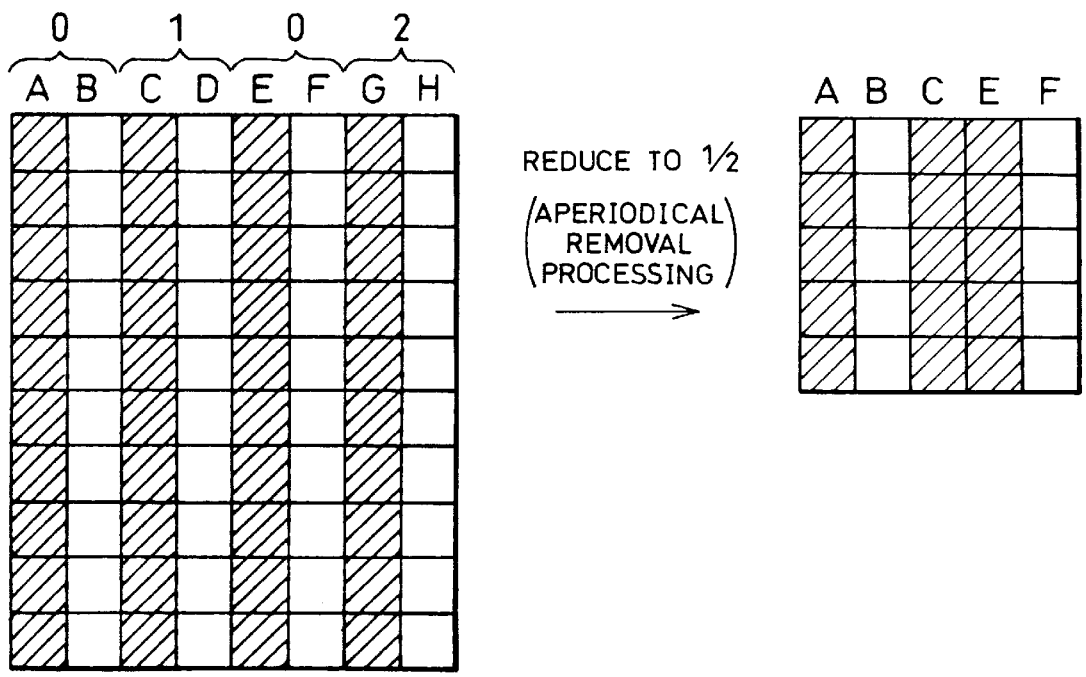
FIG. 45 is a view explaining the aperiodical removal processing when it is carried out for the entire image data.

To eliminate these inconveniences, the image data are removed aperiodically using a random number. A pattern of random numbers is, 0, 1, 2, and each value is given to every other two lines. The removal processing is not carried out when the random number is 0, one line is removed when the random number is 1, and two lines are removed when the random number is 2 to compensate for the random number of 0. This aperiodical data removal is illustrated in FIGS. 44 and 45. Herein, the pattern of random numbers is 0, 1, 0, 2 and the original image data A, B, C, D, E, F, G, H, I, . . . are compressed to A, B, C, E, F, I, . . . .

(Eighth Embodiment)

Referring to FIGS. 4 through 46, the following description will describe still another example embodiment of the present invention. Hereinafter, like components are labeled with like reference numerals with respect to the above embodiments, and the description of these components is not repeated for the explanation's convenience.

Figure 46:
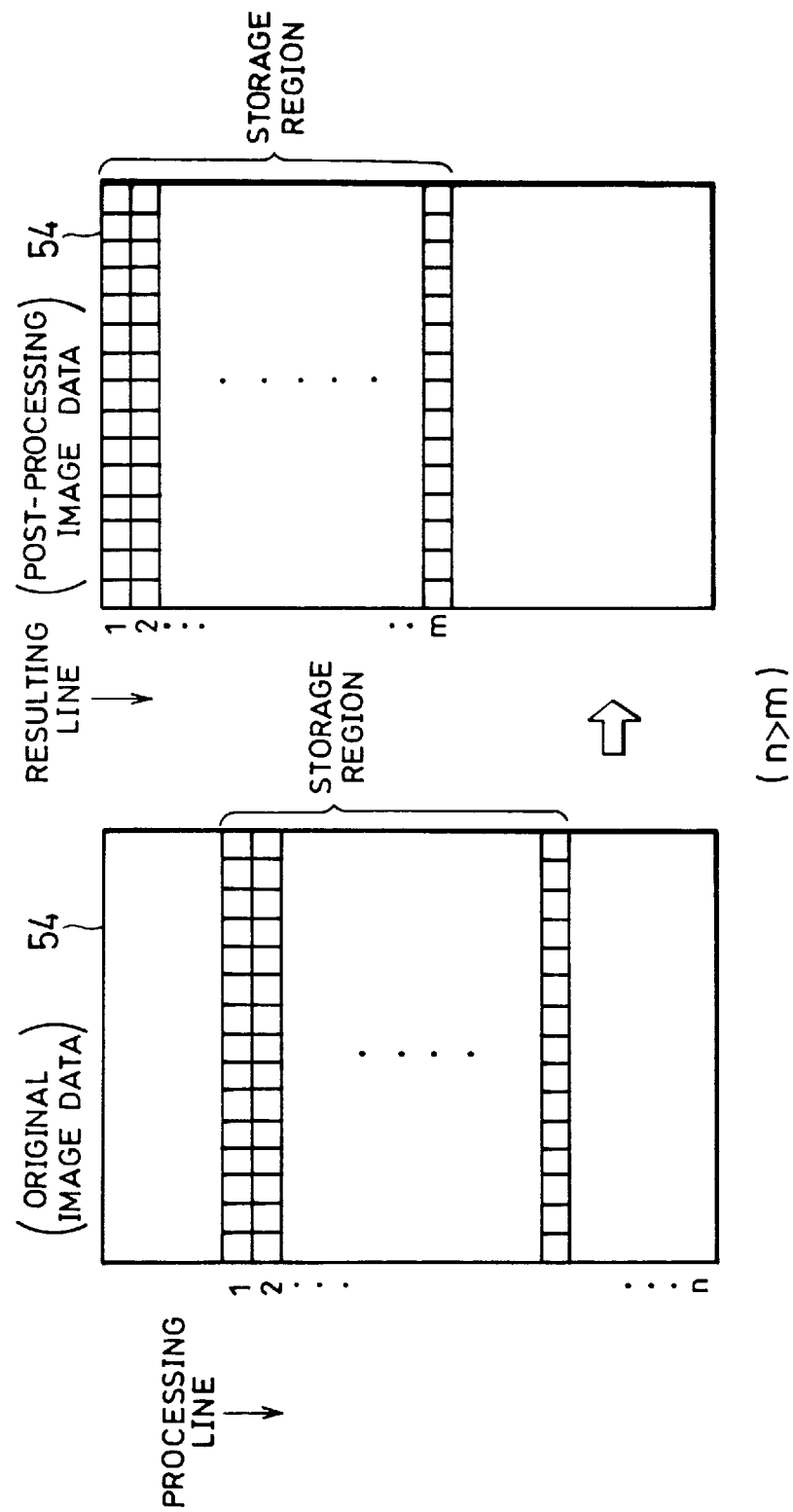
FIG. 46 is a view explaining an operation of a digital copying machine in accordance with still another embodiment of the present invention, and it shows an operation for storing image data after the scaling processing and compression processing.

The digital copying machine 10 of the present embodiment is of the structure shown in FIG. 2 and the image processing section 50 is structured as depicted in FIG. 4. Herein, the relationship between the storage region where the original image data were stored in the memory 54 and a storage region where the processed image data are stored is illustrated in FIG. 46. The left-hand portion of the drawing indicates the storage region where the original image data were stored in the memory 54. Whereas the right-hand portion of the drawing indicates the storage region where the processed image data, that is, the image data retrieved from the memory 54 and scaled by the scaling processing section 52d through the interpolation scaling first, and thence compressed by the scaling processing section 52d through quantizing value conversion, and finally stored in the memory 54. To be more precise, storing of the processed data in the memory 54 begins with a line away from the starting line of the original image data in the opposite direction to the processing direction of the original image data. Thus, the storage region of the processed image data is shifted with respect to the storage region where the original image data were stored in the direction opposite to the processing direction.

Shifting the storage region as above is effective when the processed image data are enlarged with respect to the original image data. In other words, when the size of the processed image data is equal to or smaller than that of the original image data, it never happens that the original data are lost before they are retrieved, even when the processed image data are written over the storage region where the original image data were stored. However, if the size of the processed image data is larger than that of the original image data, the original data are lost before they are retrieved if the processed image data are written over the storage region where the original image data were stored. This problem can be eliminated by shifting head line of the processed image data form the head line of the original image data in the direction opposite to the processing direction in the memory 54.

Since the storage region where the original image data were stored and the one where the processed image data are stored partially overlap, a capacity of the memory 54 can be reduced compared with a case where the original image and processed image data are stored separately in their respective storage regions.

(Ninth Embodiment)

Referring to FIGS. 4 through 47, the following description will describe still another example embodiment of the present invention. Hereinafter, like components are labeled with like reference numerals with respect to the above embodiments, and the description of these components is not repeated for the explanation's convenience.

The digital copying machine 10 of the present embodiment is of the structure shown in FIG. 2 and the image processing section 50 is structured as depicted in FIG. 4. With the digital copying machine 10 of the present embodiment, the original image data stored in the memory 54, and the processed image data, that is, the image data retrieved from the memory 54 and scaled by the scaling processing section 52d through the interpolation scaling and compressed by the scaling processing section 52d through quantizing value conversion, are stored in separate storage regions in the memory 54.

Figure 47:
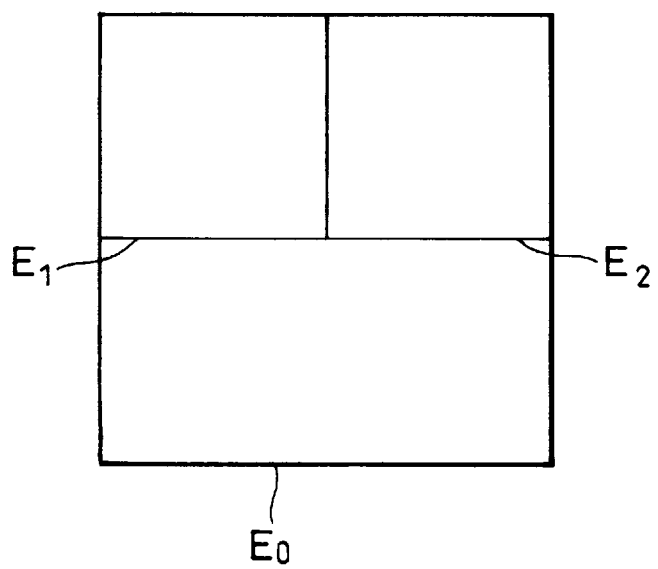
FIG. 47 is a view explaining an operation of a digital copying machine in accordance with still another embodiment of the present invention, and it shows an operation for storing image data after the scaling processing and compression processing.

Therefore, as shown in FIG. 47, let the region available for the image data be $E_0$, and the region where the original image data are stored be $E_1$, then, the scaling processing section 52d compresses the image data, enlarged by the scaling processing section 52d through the interpolation scaling, through quantizing value conversion in such a manner that the compressed image data will be stored within a region $E_2$, which is secured separately within the region $E_0$.

In FIG. 47, for example, assume that the region $E_0$ is four times as large as the region $E_1$, that is, enlarged two times in both the main scanning and sub-scanning directions, and the original image data are enlarged two times by the scaling processing section 52d. Then, the error diffusion processing section 52f compresses the image data processed by the scaling processing section 52d to ½ or less in the main scanning and sub-scanning directions, respectively.

Herein, the original image data are not erased and saved in the storage region. Thus, the original image data can be retrieved whenever occasion demands. At the same time, it is no longer necessary to increase a capacity of the memory 54 in proportion to an enlarged-scaling magnification for the original image data.

If the scaling processing section 52d has a fixed compression magnification, a following arrangement may be used instead of the above arrangement. That is, the processed image data, enlarged by the scaling processing section 52d through the interpolation scaling first and thence compressed by the error diffusion processing section 52f, are stored in the region $E_0$ in the memory 54 separately from the original image data when possible; otherwise, the processed image data are written over the original image data in the storage region $E_1$. According to this arrangement, the original image data will not be erased entirely, but saved at least partially, whenever the memory 54 has free storage region. The above operation is controlled by the image processing section 55.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A scaling control device in an image processing apparatus comprising:

storage means for storing image data;

scaling means for enlarging original image data stored in said storage means;

interpolating means for interpolating data into image data processed by said scaling means;

compressing means for compressing the image data processed by said interpolating means in such a manner that compressed image data will be stored in said storage means within a storage region, said storage region being smaller than a storage region demanded to store said original image data when said original image data are enlarged to an initially specified magnification for an output image;

storage control means for storing said image data processed by said compressing means in said storage means within a storage region including a storage region where said original image data were stored, wherein the processed image data to be stored in said storage means are made of a set of units and said storage control means stores said set of units in said storage means irrespective of their mapping positions in the original image data; and expanding means for retrieving processed image data from said storage means and for expanding retrieved image data to the initially specified magnification for an output image.

2. The scaling control device in an image processing apparatus as defined in claim 1, wherein:

said scaling means enlarges the image data to a magnification larger than the initially specified magnification for an output image; and said interpolating means adjusts an interpolation amount of data in response to said magnification used by said scaling means.

3. The scaling control device in an image processing apparatus as defined in claim 1, wherein said storage control means stores said set of units in said storing means in an order in which said sets of units are retrieved from said storage means.

4. The scaling control device in an image processing apparatus as defined in claim 1, wherein said storage control means, when the original image data are aligned at least in a direction in which said original image data are processed, starts to store a first line of the processed image data to be stored in said storage means at position shifted from a first line of said original image data in a direction opposite to said processing direction.

5. A scaling control device in an image processing apparatus comprising:

storage means for storing image data;

scaling means for enlarging original image data stored in said storage means;

interpolating means for interpolating data into image data processed by said scaling means;

compressing means for compressing the image data processed by said interpolating means to an inverse number of a magnification used by said scaling means or less:

storage control means for storing the image data processed by said compressing means in said storage means within a storage region where said original image data were stored, wherein the processed image data to be stored in said storage means are made of a set of units and said storage control means stores said set of units in said storage means irrespective of their mapping positions in the original image data; and expanding means for retrieving processed image data from said storage means and for expanding retrieved image data to an initially specified magnification for an output image.

6. The scaling control device in an image processing apparatus as defined in claim 5, wherein:

said scaling means enlarges the image data to a magnification larger than the initially specified magnification for an output image; and said interpolating means adjusts an interpolation amount of data in response to said magnification used by said scaling means.

7. The scaling control device in an image processing apparatus as defined in claim 5, wherein said storage control means stores said set of units in said storing means in an order in which said sets of units are retrieved from said storage means.

8. The scaling control device in an image processing apparatus as defined in claim 5, wherein said storage control means, when the original image data are aligned at least in a direction in which said original image data are processed, starts to store a first line of the processed image data to be stored in said storage means at a position shifted from a first line of said original image data in a direction opposite to said processing direction.

9. A scaling control device in an image processing apparatus comprising:

storage means for storing image data;

scaling means for enlarging original image data stored in said storage means;

interpolating means for interpolating data into image data processed by said scaling means;

judging means for dividing the image data into a set of blocks and for judging whether said each block is a text portion or half-tone portion;

compressing means for converting, of all the image data processed by said interpolating means, the image data of a block judged as being the text portion by said judging means into binary data, and for compressing the image data of a block judged as being the picture portion by said judging means in such a manner that compressed image data will be stored in said storage means within a storage region smaller than a storage region demanded to store said original image data when said original image data are enlarged to an initially specified magnification for an output image;

storage control means for storing said image data processed by said compressing means in said storage means within a storage region including a storage region where said original image data were stored; and expanding means for retrieving processed image data from said storage means and for expanding retrieved image data to the initially specified magnification for an output image.

10. The scaling control device in an image processing apparatus as defined in claim 9, wherein:

said scaling means enlarges the image data to a magnification larger than the initially specified magnification for an output image; and said interpolating means adjusts an interpolation amount of data in response to said magnification used by said scaling means.

11. The scaling control device in an image processing apparatus as defined in claim 9, wherein the processed image data to be stored in said storage means are made of a set of units and said storage control means stores said set of units in said storage means irrespective of their mapping positions in the original image data.

12. The scaling control device in an image processing apparatus as defined in claim 11, wherein said storage control means stores said set of units in said storing means in an order in which said sets of units are retrieved from said storage means.

13. The scaling control device in an image processing apparatus as defined in claim 11, wherein said storage control means, when the original image data are aligned at least in a direction in which said original image data are processed, starts to store a first line of the processed image data to be stored in said storage means at a position shifted from a first line of said original image data in a direction opposite to said processing direction.

14. A scaling control device in an image processing apparatus comprising:

storage means for storing image data;

scaling means for enlarging original image data stored in said storage means;

interpolating means for interpolating data into image data processed by said scaling means;

judging means for dividing the image data into a set of blocks and for judging whether said each block is a text portion or half-tone portion;

compressing means for converting, of all the image data processed by said interpolating means, the image data of a block judged as being the text portion by said judging means into binary data, and for compressing the image data of a block judged as being the picture portion by said judging means in accordance with a free capacity of said storage means;

storage control means for storing said image data processed by said compressing means in said storage means within a storage region including a storage region where said original image data were stored; and expanding means for retrieving processed image data from said storage means and for expanding retrieved image data to an initially specified magnification for an output image.

15. The scaling control device in an image processing apparatus as defined in claim 14, wherein said compressing means judges the free capacity of said storage means based on a ratio of the text portion and half-tone portion in the image data.

16. The scaling control device in an image processing apparatus as defined in claim 14, wherein:

said scaling means enlarges the image data to a magnification larger than the initially specified magnification for an output image; and said interpolating means adjusts an interpolation amount of data in response to said magnification used by said scaling means.

17. The scaling control device in an image processing apparatus as defined in claim 14, wherein the processed image data to be stored in said storage means are made of a set of units and said storage control means stores said set of units in said storage means irrespective of their mapping positions in the original image data.

18. The scaling control device in an image processing apparatus as defined in claim 17, wherein said storage control means stores said set of units in said storing means in an order in which said sets of units are retrieved from said storage means.

19. The scaling control device in an image processing apparatus as defined in claim 17, wherein said storage control means, when the original image data are aligned at least in a direction in which said original image data are processed, starts to store a first line of the processed image data to be stored in said storage means at a position shifted from a first line of said original image data in a direction opposite to said processing direction.

20. A scaling control device in an image processing apparatus comprising:

a line buffer for storing input image data;

scaling means for enlarging original image data stored in said line buffer;

compressing means for compressing the image data after scaling in such manner that compressed image data will be stored in said storage means within a storage region smaller than a storage region demanded to store said original image data when said original image data are enlarged to an initially specified magnification for an output image;

judging means for dividing the original image data stored in said line buffer into a set of blocks and for judging whether said each block is a text portion or half-tone portion;

interpolating means for, when a block is judged to be the half-tone portion by said judging means, interpolating data to the image data of said block when said image data are processed by said scaling means before being processed by said compressing means;

storage means for storing the image data processed by said compressing means, said storage means having a storage capacity larger than a storage capacity of said line buffer; and expanding means for retrieving processed image data from said storage means and for expanding retrieved image data to the initially specified magnification for an output image.

21. The scaling control device in an image processing apparatus as defined in claim 20, wherein:

said scaling means enlarges the image data to a magnification larger than the initially specified magnification for an output image; and said interpolating means adjusts an interpolation amount of data in response to said magnification used by said scaling means.

22. A scaling control device in an image processing apparatus comprising:

storage means for storing image data;

scaling means for enlarging original image data stored in said storage means;

interpolating means for interpolating data into image data processed by said scaling means;

compressing means for compressing the image data processed by said interpolating means;

storage control means for, when a first storage region demanded to store processed image data to be stored in said storage means and said original image data separately in said storage means is smaller than a second storage region demanded to store said original image data enlarged to an initially specified magnification for an output image, storing said processed image data and said original image data respectively in separate storage regions, and when said first storage region is larger than said second storage, said storage control means storing said processed image data in a storage region including a storage region where said original image were stored; and expanding means for retrieving processed image data from said storage means and for expanding retrieved image data to the initially specified magnification for an output image.

23. The scaling control device in an image processing apparatus as defined in claim 22, wherein:

said scaling means enlarges the image data to a magnification larger than the initially specified magnification for an output image; and said interpolating means adjusts an interpolation amount of data in response to said magnification used by said scaling means.

24. A scaling control device in an image processing apparatus comprising:

storage means for storing image data;

scaling means for enlarging original image data stored in said storage means;

interpolating means for interpolating data into image data processed by said scaling means;

compressing means for compressing the image data processed by said interpolating means in such a manner that compressed image data and said original image data will be stored respectively in separate storage regions in said storage means;

storage control means for storing the image data processed by said compressing means and said original image data respectively in separate storage regions in said storage means, wherein said storage control means judges whether processed image data can be stored in a first storage region where the original image data are stored and a second storage region secured separately from said first storage region in said storage means, and upon positive judgement, said storage control means directly stores the processed image data in said second storage region and upon negative judgement, said storage control means overwrites the processed image data in said first storage region; and expanding means for retrieving processed image data from said storage means and for expanding retrieved image data to the initially specified magnification for an output image.

25. The scaling control device in an image processing apparatus as defined in claim 24, wherein:

said scaling means enlarges the image data to a magnification larger than the initially specified magnification for an output image; and said interpolating means adjusts an interpolation amount of data in response to said magnification used by said scaling means.

* * * * *